United States Patent
Takagi et al.

(10) Patent No.: US 9,055,044 B2
(45) Date of Patent: Jun. 9, 2015

(54) COMPUTER SYSTEM AND METHOD OF CONTROLLING COMPUTER SYSTEM

(71) Applicant: Hitachi, Ltd., Tokyo (JP)

(72) Inventors: Takumi Takagi, Odawara (JP); Takashi Chikusa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 13/703,741

(22) PCT Filed: Dec. 3, 2012

(86) PCT No.: PCT/JP2012/007732
§ 371 (c)(1),
(2) Date: Dec. 12, 2012

(87) PCT Pub. No.: WO2014/087441
PCT Pub. Date: Jun. 12, 2014

(65) Prior Publication Data
US 2014/0173017 A1   Jun. 19, 2014

(51) Int. Cl.
G06F 15/167 (2006.01)
H04L 29/08 (2006.01)
G06F 12/08 (2006.01)
H04N 21/231 (2011.01)
G06F 3/06 (2006.01)
G06F 13/00 (2006.01)

(52) U.S. Cl.
CPC ............ *H04L 67/06* (2013.01); *G06F 12/0873* (2013.01); *H04N 21/23116* (2013.01); *G06F 3/0613* (2013.01); *G06F 3/0635* (2013.01); *G06F 3/065* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 6,490,659 B1 * | 12/2002 | McKean et al. | 711/141 |
| 2002/0133740 A1 * | 9/2002 | Oldfield et al. | 714/6 |
| 2008/0126885 A1 * | 5/2008 | Tangvald et al. | 714/54 |
| 2010/0106683 A1 * | 4/2010 | Nomoto et al. | 707/610 |
| 2014/0195735 A1 * | 7/2014 | Maroney et al. | 711/114 |

* cited by examiner

*Primary Examiner* — Wen-Tai Lin
(74) *Attorney, Agent, or Firm* — Foley & Lardner LLP

(57) ABSTRACT

In order to reduce the amount of consumption of a back-end bandwidth in a storage apparatus, a computer system includes: a first storage device; and a second storage device that is coupled to the first controller through a first interface and is coupled to the second controller through a second interface. The first controller receives data from a host computer through a first communication channel; write the received data into the first storage device; identify part of the received data as first data, the part satisfying a preset particular condition; and write a replica of the first data as second data into the second storage device. The second controller reads the second data from the second storage device in response to a Read request received from the host computer through a second communication channel; and transmit the second data to the host computer through the second communication channel.

14 Claims, 31 Drawing Sheets

Fig.9

| 3110 | 3120 | 3130 | 3140 | 3210 | 3220 | 3230 | 3240 | 3250 | 3260 |
|---|---|---|---|---|---|---|---|---|---|
| Virtual apparatus ID | Virtual VOL ID | Virtual LBA | Block length | Pool ID | Entry start number | Number of used entries | Attribute flag | New allocation time | SEQ flag |
| VST01 | VVOL1 | 00000000h | 200000h | Pool-1 | P0001 | 2000h | T3R/W+ Cache All | 2012/03/12 10:20:30 | 1 |
| VST01 | VVOL1 | 00200000h | 10h | Pool-1 | P0002 | 10h | DEL | 2012/03/12 10:21:31 | 0 |
| VST01 | VVOL2 | 00000000h | 100h | Pool-1 | P0003 | 100h | T2R/W | 2012/03/12 10:21:32 | 0 |
| : | : | : | : | : | : | : | : | : | : |

Fig.10

| 3310 | 3320 | 3330 | 3340 | 3350 | 3410 | 3420 | 3430 | 3440 | 3450 |
|---|---|---|---|---|---|---|---|---|---|
| Entry number | Page number | RAID Gr. number | Start LBA | Block length | Enablement flag | Power saving state | Number of SAS accesses | Number of PCIe accesses | Last update time |
| P001 | 00000000h | 0101h | 00000000h | 100h | Y | L4 Sleep | 5 | 10000 | 2012/03/12 10:20:30 |
|  | 00000001h | 0101h | 00000100h | 100h | Y | L4 Sleep | 5 | 10000 | 2012/03/12 10:20:30 |
| : | : | : | : | : | : | : | : | : | : |
|  | 0001FFFh | 0110h | 0001F00h | 100h | Y | L3 Low-rpm | 1 | 1765 | 2012/03/12 10:20:32 |
| P002 | 00020000h | 0021h | 00002000h | 10h | N |  | 2 | 0 | 2012/03/13 11:22:33 |
| P003 | 00020001h | 0021h | 00002100h | 100h | Y | L0 Active | 26 | 0 | 2012/06/12 15:26:37 |
| : | : | : | : | : | : | : | : | : | : |

| 3510 | 3520 | 3530 | 3540 | 3610 | 3620 | 3630 | 3640 | 3650 |
|---|---|---|---|---|---|---|---|---|
| Virtual apparatus ID | Virtual VOL ID | Virtual LBA | Block length | RAID Gr. number | External cache area LBA | Occupied block length | Entry enablement flag | Number of PCIe accesses |
| VST01 | VVOL1 | 00000000h | 200000h | 01 | 00000000h | 200000h | ALL | 10000 |
| VST02 | VVOL2 | 00000000h | 200000h | 01 | 00200000h | 200000h | ALL | 500 |
| N/A | N/A | N/A | N/A | 01 | 00400000h | 100000h | DEL | N/A |
| N/A | N/A | N/A | N/A | 01 | 00500000h | 200000h | ALL | 0 |
| : | : | : | : | : | : | : | : | : |

Fig.26

|    | SCSI command issued by DKC | SAS-CTL functions etc. | PCIe-CTL states etc. | Status register |
|----|----------------------------|------------------------|----------------------|-----------------|
| C1 | WRITE_SAME (UNMAP bit =ON) | Designated area disablement on third table (urgent) | Data transfer during third table update is impossible | Metadata updating Interrupt request |
| C2 | WRITE_SAME (UNMAP bit =OFF) | Designated area release on third table (entry deletion / record update) | Data transfer during third table update is possible (continuous operation is possible) | Metadata updating Metadata enablement Interrupt request |
| C3 | WRITE(16) or WRITE(10) | Data storage to designated area Entry addition to third table | (Normally, update report is not made at this stage) | (Update report is not made at this stage) |
| C4 | EXTENDED COPY (XCOPY) | Association of virtual VOL_ID and LBA with entry in third table | Data transfer during third table update is possible (continuous operation is possible) | Metadata updating Metadata enablement Interrupt request |
| C5 | MODE_SELECT(10) | Without third table update RAID group configuration information transmission etc. | Without third table update RAID group configuration information configuring etc. (continuous operation is possible) | Interrupt request Particular process request |
| C6 | MODE_SENSE(10) | Configuration information reading / third table reading etc. | Configuration information transmission / metadata transmission etc. (continuous operation is possible) | Interrupt request Particular process request |
| C7 | SEND_DIAGNOSTIC | Diagnosis / FW update / CTL_forced stop etc. | Diagnosis / FW update / CTL_forced stop etc. (continuous operation is impossible) | Interrupt request Particular process request Forced stop request |

Fig.27

CDB of XCOPY command

| Byte position | Contents (value etc.) |
|---|---|
| 0 | Operation Code (83h) |
| 1-9 | All Zeros (0h) |
| 10-13 | Parameter Length (Descriptor length) |
| 14 | Zero (0h) |
| 15 | Control Byte |

Format of descriptor of XCOPY command

| Descriptor |
|---|
| Header |
| Source Target Descriptor (Multiple descriptions are possible)<br>Array Port & LUN Identifiers |
| Destination Target Descriptor (Multiple descriptions are possible)<br>Array Port & LUN Identifiers |
| Segment Descriptor (Multiple descriptions are possible)<br>Starting Read LBA on Source LUN<br>Starting Write LBA on Destination LUN<br>Number of blocks in this segment |

Example of descriptor of XCOPY command

| Descriptor | |
|---|---|
| Header | |
| Source Target Descriptor 1(Hybrid SSD casing #1／external cacheHSRG0)<br>Casing identifier & external cache RG／LUN Identifiers | INDEX 0 |
| Source Target Descriptor 2(1(Hybrid SSD casing #1／external cache HSRG1)<br>Casing identifier & external cache RG／LUN Identifiers | INDEX 1 |
| Destination Target Descriptor 1(Virtual storage VS1／VLUN0)<br>Virtual Array Port & Virtual LUN Identifiers | INDEX 2 |
| Destination Target Descriptor 2(1(Virtual storage VS1／VLUN1)<br>Virtual Array Port & Virtual LUN Identifiers | INDEX 3 |
| Destination Target Descriptor 3(1(Virtual storage VS2／VLUN0)<br>Virtual Array Port & Virtual LUN Identifiers | INDEX 4 |
| Segment Descriptor 1<br>External cache LBA(e.g.00001000h) on HSRG0 (INDEX 0)<br>Corresponding virtual LUN LBA(e.g.00123400h) on VLUN0 (INDEX 2)<br>Number of used blocks(e.g.00100000h) | |
| Segment Descriptor 2<br>: | |

Fig.28

| | Target Type Code | Contents | Mapping target |
|---|---|---|---|
| 1 | E0 | N_PORT_NAME<br>Target is designated by N_Port_Name, which is determined by VN_Port at the time of port log-in (PLOGI) of fibre channel protocol. | LUN of virtual storage (FC) |
| 2 | E1 | N_PORT_ID (not recommended)<br>Target is designated by D_ID of fibre channel protocol. | LUN of virtual storage (FC) |
| 3 | E2 | N_PORT_NAME and N_PORT_ID<br>Under non-fabric environments, target is designated by N_Port_Name and D_ID described above. | LUN of virtual storage (FC) |
| 4 | E4 | Target is designated by identifier reported to SCSI INQUIRY VPD page 83h. | Internal LUN etc. |
| 5 | E5 | Target is designated by IPv4 address. | LUN of virtual storage (IP) |
| 6 | E9 | Target is designated by SAS address. | LUN of virtual storage (SAS) |
| 7 | EA | Target is designated by IPv6 address. | LUN of virtual storage (IP) |
| 8 | EB | Target is designated by IP copy service descriptor. | (Not used) |

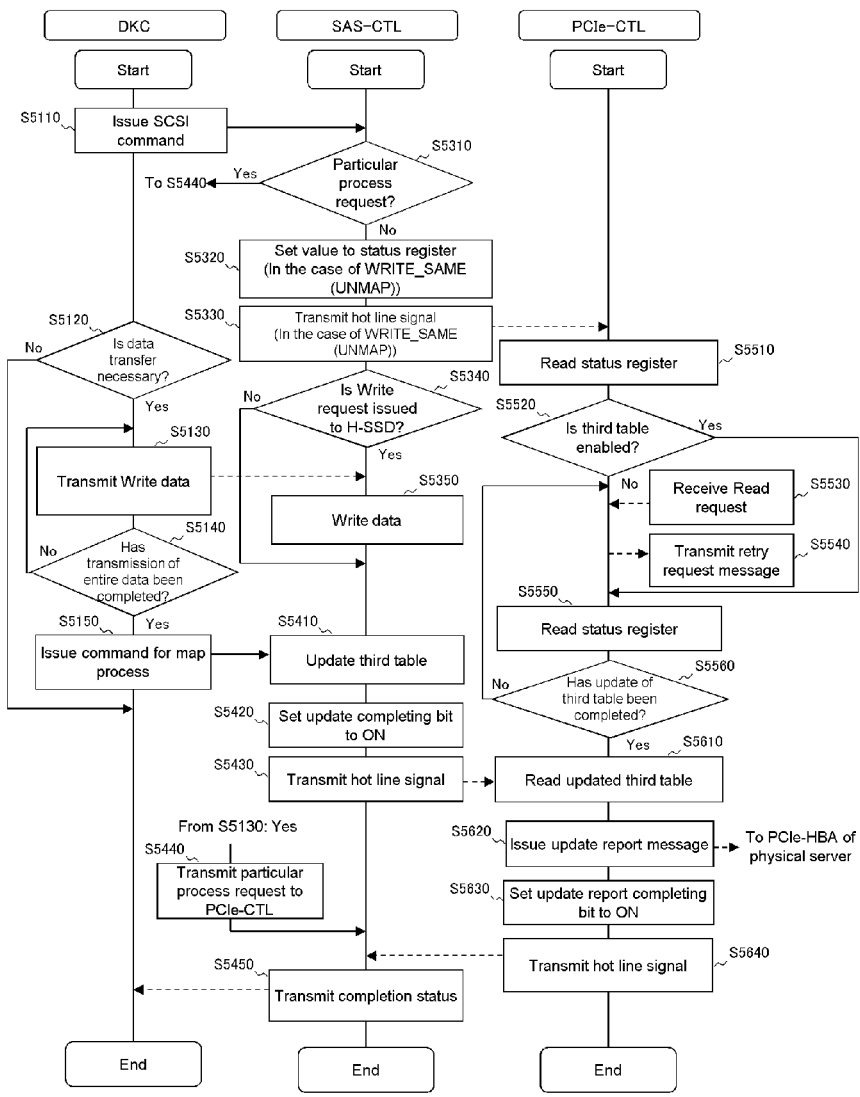

COMPUTER SYSTEM AND METHOD OF CONTROLLING COMPUTER SYSTEM

TECHNICAL FIELD

The present invention relates to a computer system including a memory apparatus.

BACKGROUND ART

Rich data (such as moving image data) and backup data, which have a large size and are hardly changed once created, are exemplified as data treated by storage apparatuses.

Further, a storage apparatus may be shared by a plurality of hosts, and parallel processing may be performed by a plurality of virtual machines (VMs) in a host. A back-end bandwidth, which is an interface bandwidth between a controller and a drive in the storage apparatus, is consumed in the case where the storage apparatus receives, in a high load state, a request from another host that shares the back-end bandwidth.

If the storage apparatus returns data stored in a cache memory in response to a Read request, such consumption of the back-end bandwidth can be reduced. The storage apparatus reads data ahead for sequential access, but the entirety of large-volume data cannot be stored in the cache memory. Further, concentrated sequential access to the same large-volume file by a large number of users causes an operation similar to random access to the same large-volume file. Accordingly, reload and purge are repeated in the cache memory, and a large amount of back-end bandwidth is consumed. Further, in hybrid cloud environments, the back-end bandwidth is consumed by contents access and internal processing, so that the responsiveness is likely to become lower.

A known technique involves replicating contents to another drive and allowing access to both the original contents and the replicated contents, to thereby improve the responsiveness (for example, PTL 1).

CITATION LIST

Patent Literature

[PTL 1] U.S. Patent Laid-Open No. 2010/0106683

SUMMARY OF INVENTION

Technical Problem

Load distribution to a plurality of drives can solve a bottleneck due to drive performance, but the amount of consumption of a back-end bandwidth cannot be reduced.

Solution to Problem

A computer system according to an aspect of the present invention includes: a first controller coupled to a host computer through a first communication channel; a second controller coupled to the host computer through a second communication channel; a first storage device coupled to the first controller; and a second storage device that is coupled to the first controller through a first interface and is coupled to the second controller through a second interface. The first controller is configured to: receive data from the host computer through the first communication channel; write the received data into the first storage device; identify part of the received data as first data, the part satisfying a preset particular condition; and write a replica of the first data as second data into the second storage device. The second controller is configured to: read the second data from the second storage device in response to a Read request received from the host computer through the second communication channel; and transmit the read second data to the host computer through the second communication channel.

Advantageous Effects of Invention

According to the present invention, the amount of consumption of a back-end bandwidth in a storage apparatus can be reduced.

BRIEF DESCRIPTION OF DRAWINGS

FIG. 9 illustrates a first table.
FIG. 10 illustrates a second table.
FIG. 26 illustrates special operations according to SCSI commands.
FIG. 27 illustrates an XCOPY command for a map process.
FIG. 28 illustrates descriptor type codes in the XCOPY command for the map process.
FIG. 29 illustrates a metadata update process in a storage apparatus.

DESCRIPTION OF EMBODIMENTS

Hereinafter, an embodiment mode of the present invention is described with reference to the drawings.

Figure 1:
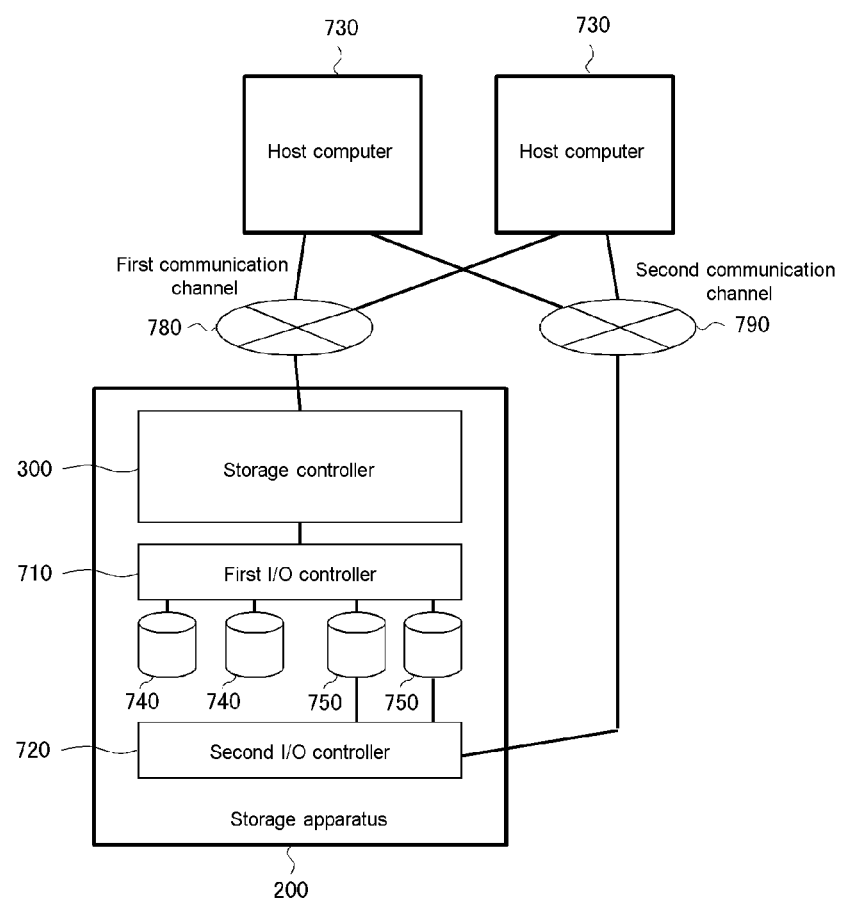
FIG. 1 illustrates a configuration of a computer system according to an embodiment mode of the present invention.

FIG. 1 illustrates a configuration of a computer system according to the embodiment mode of the present invention. The computer system includes a storage apparatus 200, a plurality of host computers 730 that are higher-level apparatuses of the storage apparatus 200, a first communication channel 780, and a second communication channel 790. The storage apparatus 200 includes a storage controller 300, a first I/O controller 710, a second I/O controller 720, a first storage device 740, and a second storage device 750. The first I/O controller 710 is coupled to the first storage device 740 and the second storage device 750 through a first interface (I/F). The second I/O controller 720 is coupled to the second storage device 750 through a second I/F. The storage controller 300 is coupled to the first I/O controller 710 through the first I/F and the like. Each host computer 730 is coupled to the storage controller 300 through the first communication channel 780, and is coupled to the second I/O controller 720 through the second communication channel 790. A first controller corresponds to, for example, the storage controller 300 and the first I/O controller 710. A second controller corresponds to, for example, the second I/O controller 720.

The storage controller 300 writes data that is received from the host computer 730 through the first communication channel 780, into the first storage device 740. The storage controller 300 identifies part of the data written into the first storage device 740, the part satisfying a particular condition, and copies the identified data into an external cache area in the second storage device 750. After the copy, the second I/O controller 720 reports a change in metadata to the host computer 730 through the second communication channel 790. The second I/O controller 720 responds to Read access from the host computer 730, through the second I/F, whereby consumption of a back-end bandwidth of the first I/F is reduced. Further, the storage apparatus 200 determines a change in contents of data in the external cache area, and reports the determined change to the host computer 730 without depending on an instruction from host computer 730. In the case where a VM operates on the host computer 730, the VM can use the external cache area similarly to a cache memory in the host computer 730.

A conventional storage apparatus is coupled to a higher-level apparatus through a storage I/F such as a fibre channel (FC). According to such a storage I/F, the storage apparatus (target) is controlled to respond by an instruction from the higher-level apparatus (initiator), and hence it is difficult for the storage apparatus to transmit management information on data update and the like to the higher-level apparatus without depending on an instruction from the higher-level apparatus. Meanwhile, the second storage device 750 includes the first I/F and the second I/F different from the first I/F. The second I/F supports reporting from the storage apparatus 200 to the host computer 730 and multicasting. As a result, the storage apparatus 200 can transmit updated metadata to the plurality of host computers 730, and mismatching in data can be prevented between the storage apparatus 200 and the plurality of host computers 730.

In embodiments described below, the first I/F is Serial Attached Small Computer System Interface (SAS), the second I/F is Peripheral Component Interconnect Express (PCIe), and the network I/F is FC. The first I/F may also be, for example, Serial Advanced Technology Attachment (SATA). The second I/F may also be, for example, InfiniBand. The network I/F may also be Ethernet. Further, the network I/F may be a protocol such as Internet Small Computer System Interface (iSCSI) or Fibre Channel over Ethernet (FCoE) using Converged Network Adapter (CNA) and Converged Enhanced Ethernet (CEE). In the embodiments described below, a SCSI over PCI-express (SOP) protocol is used for data transfer of PCIe, but a protocol such as Non-Volatile Memory (NVM)-express may be used therefor.

Embodiment 1

Figure 2:
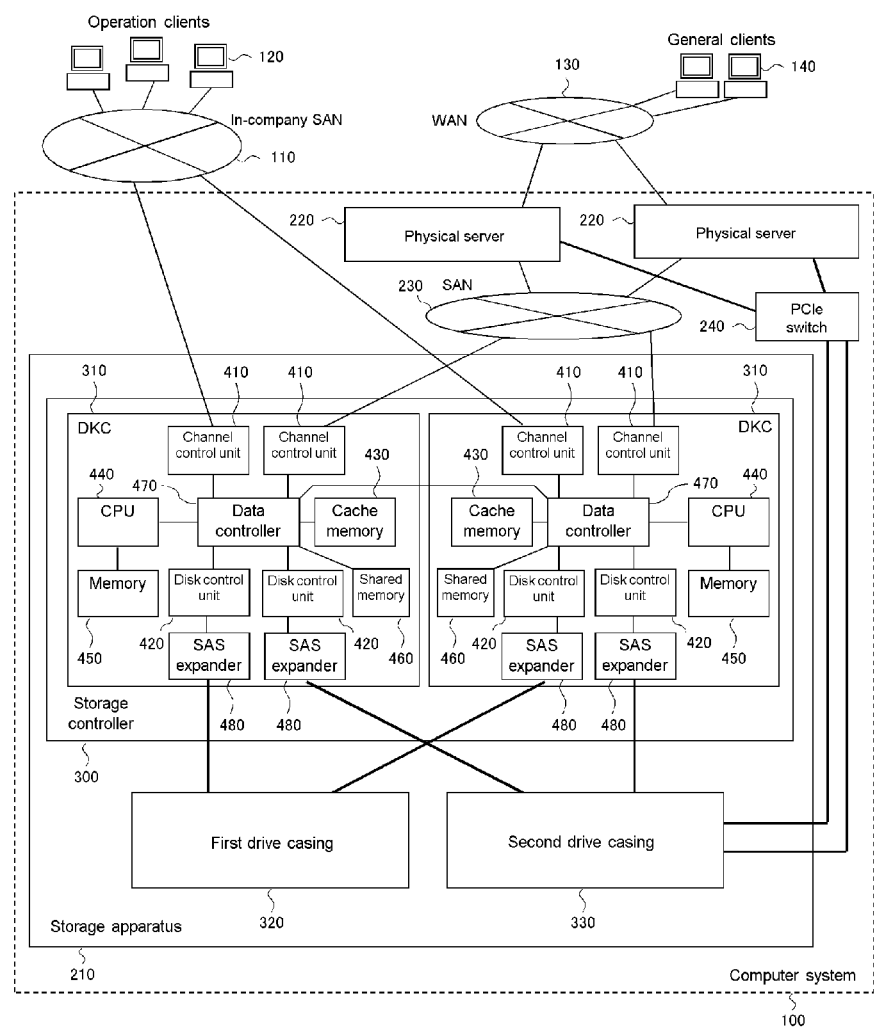
FIG. 2 illustrates a configuration of a computer system according to Embodiment 1.

FIG. 2 illustrates a configuration of a computer system according to Embodiment 1. A computer system 100 includes a storage apparatus 210 (an example of the storage apparatus 200), a plurality of physical servers 220 (an example of the host computers 730), a SAN 230 (an example of the first communication channel 780), and a PCIe switch 240 (an example of the second communication channel 790). The storage apparatus 210 is coupled to a plurality of operation clients 120 through a network such as an in-company storage area network (SAN) 110. Each of the plurality of physical servers 220 is coupled to a plurality of general clients 140 through a network such as a wide area network (WAN) 130. The storage apparatus 210 is coupled to the plurality of physical servers 220 through the SAN 230, and is coupled to the plurality of physical servers 220 through the PCIe switch 240. The SAN 230 may include an FC switch and the like. Each operation client 120 makes a request of backup or the like to the storage apparatus 210. Each general client 140 makes a request of rich data Read or the like to the storage apparatus 210.

The storage apparatus 210 includes the storage controller 300, a first drive casing 320, and a second drive casing 330. The storage controller 300 may include a plurality of storage controllers (DKCs) 310, or may include one DKC 310. The DKC 310 manages the first drive casing 320 as a hierarchical storage, and creates an external cache area for the plurality of physical servers 220 in the second drive casing 330.

The DKC 310 includes a plurality of channel control units 410, a plurality of disk control units 420, a cache memory 430, a microprocessor such as a central processing unit (CPU) 440, a memory 450, a shared memory 460, a data controller 470, and a SAS expander 480. The data controller 470 is coupled to the channel control units 410, the disk control units 420, the cache memory 430, the CPU 440, the shared memory 460, and the data controller 470 of another DKC 310, and controls communications therebetween. The SAS expander 480 is coupled to each disk control unit 420, and is also coupled to the first drive casing 320. The CPU 440 controls the respective parts of the DKC 310 on the basis of programs and data in the memory 450. The shared memory 460 stores therein metadata and the like of the storage apparatus 210. Each channel control unit 410 is coupled to the SAN 230, controls inputs and outputs with respect to the physical servers 220 through FC protocol, and transfers data with respect to the cache memory 430 through the data controller 470. Each disk control unit 420 controls inputs and outputs with respect to the first drive casing 320 or the second drive casing 330. The DKC 310 may include one channel control unit 410, or may include one disk control unit 420.

Figure 3:
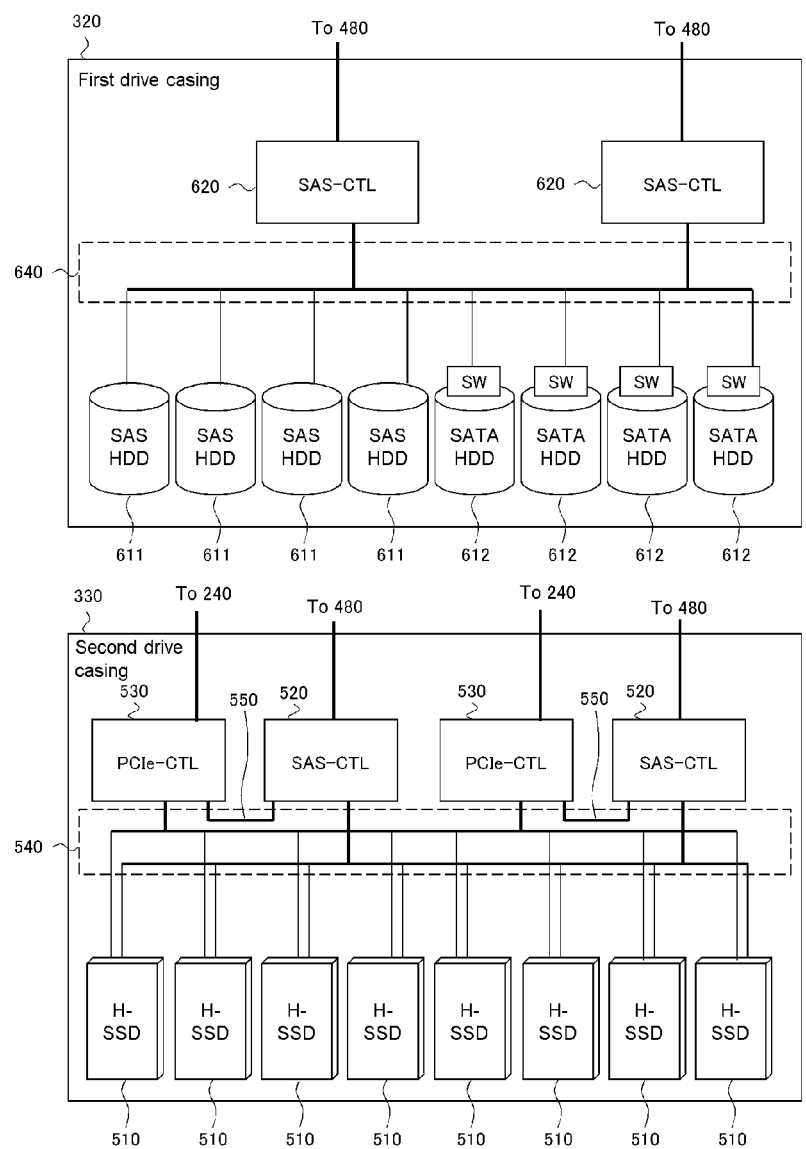
FIG. 3 illustrates configurations of a first drive casing 320 and a second drive casing 330.

FIG. 3 illustrates configurations of the first drive casing 320 and the second drive casing 330.

The first drive casing 320 includes a plurality of SAS drives (an example of the first storage device 740), a plurality of SAS I/O controllers (SAS-CTLs) 620 (an example of the first I/O controller 710), and a midplane board 640. Each SAS-CTL 620 is coupled to the SAS expander 480. The plurality of SAS drives include a plurality of SAS hard disk drives (SAS- HDDs) 611 and a plurality of SATA-HDDs 612. The SAS-HDDs 611 and the SATA-HDDs 612 are coupled to the SAS-CTLs 620 through the midplane board 640. The SAS-HDDs 611 and the SATA-HDDs 612 are used as a hierarchical storage. Only any one of the SAS-HDDs 611 and the SATA-HDDs 612 may be used. The plurality of SAS drives may further include a plurality of solid state drives (SSDs), and the SSDs, the SAS-HDDs 611 slower than the SSDs, and the SATA-HDDs 612 slower than the SAS-HDDs 611 may be used as a hierarchical storage. Note that, although not illustrated, each SAS-CTL 620 may be provided with an interface (first I/F) for coupling to another drive casing (for expansion).

The second drive casing 330 includes a plurality of hybrid SSDs (H-SSDs) 510 (an example of the second storage device 750), a plurality of SAS-CTLs 520 (an example of the first I/O controller 710), a plurality of PCIe I/O controllers (PCIe-CTLs) 530 (an example of the second I/O controller 720), and a midplane board 540. Each SAS-CTL 520 may be coupled to the SAS expander 480, and may be coupled to another SAS-CTL 520. Each PCIe-CTL 530 is coupled to the plurality of physical servers 220 through the PCIe switch 240. The plurality of H-SSDs 510 are SSDs including both SASs and PCIes, and are coupled to the SAS-CTLs 520 and the PCIe-CTLs 530 through the midplane board 540. One SAS-CTL 520 and one PCIe-CTL 530 form a pair, and are coupled to each other by a hot line 550 on the midplane board 540. The hot line 550 is a communication I/F for guaranteeing metadata. Each pair of the SAS-CTL 520 and the PCIe-CTL 530 includes a status register indicating statuses of metadata and the like, and can refer to the status register through the midplane board 540. In the following description, the SAS drives and the H-SSDs 510 may be referred to as drives in some cases.

Figure 4:
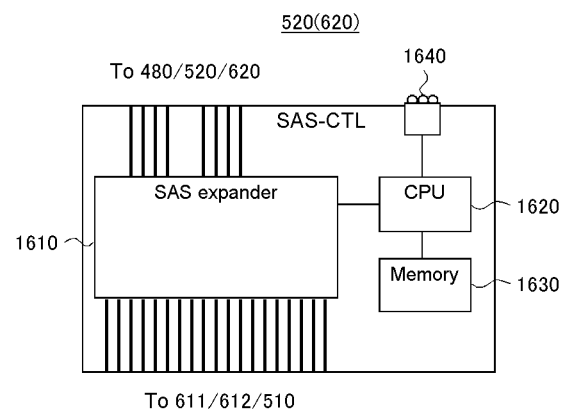
FIG. 4 illustrates a configuration of a SAS-CTL 520.

FIG. 4 illustrates a configuration of the SAS-CTL 520. The SAS-CTL 520 includes a SAS expander 1610, a CPU 1620, a memory 1630, and a status light emitting diode (LED) 1640. The CPU 1620 controls the SAS expander 1610 on the basis of programs and data in the memory 1630. The status LED 1640 displays a status of the SAS-CTL 520. The SAS expander 1610 is coupled to the SAS expander 480, the plurality of H-SSDs 510, and the like, and controls communications autonomously or on the basis of an instruction from the CPU 1620. The SAS expander 1610 may be coupled to the SAS expander 620 or the SAS expander 1610 of another SAS-CTL 520. A configuration of the SAS-CTL 620 is similar to that of the SAS-CTL 520, but the SAS expander 1610 thereof is coupled to the SAS expander 480, the plurality of SAS drives, and the like.

Figure 5:
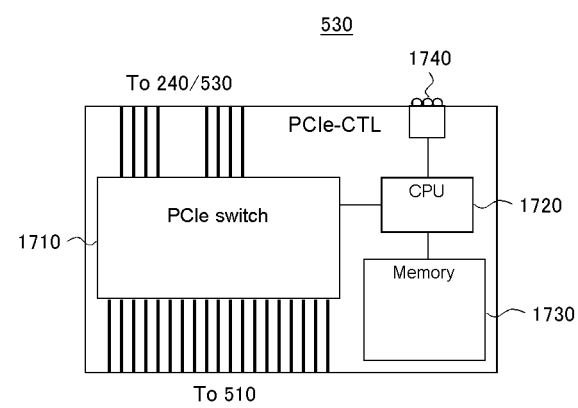
FIG. 5 illustrates a configuration of a PCIe-CTL 530.

FIG. 5 illustrates a configuration of the PCIe-CTL 530. The PCIe-CTL 530 includes a PCIe switch 1710, a CPU 1720, a memory 1730, and a status LED 1740. The memory 1730 stores therein programs and data. The CPU 1720 controls the PCIe switch 1710 on the basis of the programs and the data in the memory 1730. The status LED 1740 displays a status of the PCIe-CTL 530. The PCIe switch 1710 controls communications between the PCIe switch 240 and the plurality of H-SSDs 510 autonomously or on the basis of an instruction from the CPU 1720. The memory 1730 further stores therein metadata read out of the H-SSDs 510 and metadata to be written into the H-SSDs 510. The PCIe switch 1710 may be coupled to another PCIe-CTL 530, and may exchange therewith the metadata in the memory 1730. Note that, although not illustrated in FIG. 4 and FIG. 5, the SAS-CTL 520 and the PCIe-CTL 530 each include a logic circuit and the like for exchanging a hot line signal and register information, in addition to the above-mentioned components.

Figure 6:
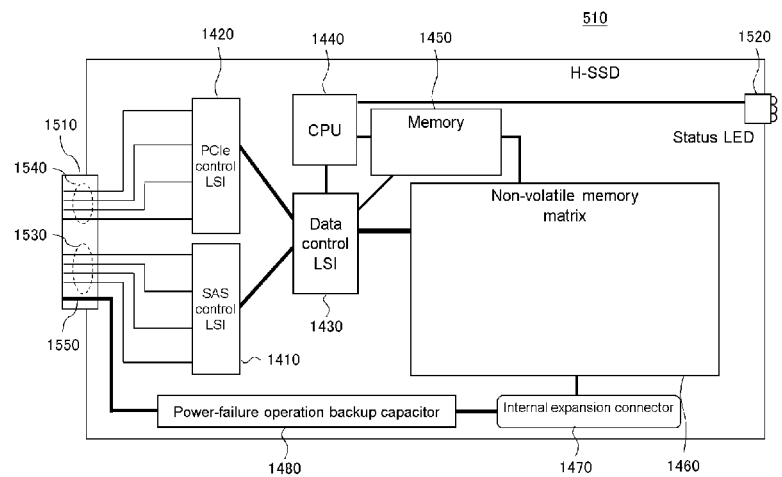
FIG. 6 illustrates a configuration of an H-SSD 510.

FIG. 6 illustrates a configuration of the H-SSD 510. The H-SSD 510 includes a SAS control LSI 1410, a PCIe control LSI 1420, a data control LSI 1430, a CPU 1440, a memory 1450, a non-volatile memory matrix 1460, an internal expansion connector 1470 for adding a non-volatile memory, a power-failure operation backup capacitor 1480 for operating in case of a power failure, a connector 1510, and a status LED 1520 for displaying a status of the CPU 1440. The connector 1510 includes a plurality of SAS ports 1530, a plurality of PCIe ports 1540, and a power supply ports 1550. The plurality of SAS ports 1530 have a wide link port configuration obtained by putting the SAS ports 1530 together or a multi-link port configuration that allows each SAS port 1530 to serve as an individual port. In a dual port configuration, the plurality of SAS ports 1530 are respectively coupled to the plurality of SAS-CTLs 520. Similarly, the plurality of PCIe ports 1540 are respectively coupled to the plurality of PCIe-CTLs 530. The SAS control LSI 1410 is coupled to the plurality of SAS ports 1530, and controls communications with the plurality of SAS-CTLs 520. The PCIe control LSI 1420 is coupled to the plurality of PCIe ports 1540, and controls communications with the plurality of PCIe-CTLs 530. The data control LSI 1430 is coupled to the SAS control LSI 1410, the PCIe control LSI 1420, the CPU 1440, the memory 1450, and the non-volatile memory matrix 1460, and performs encryption/decryption, NVM control, I/F load monitoring, logical division, and the like. The memory 1450 stores therein programs and data for controlling the H-SSD 510. The CPU 1440 controls the H-SSD 510 on the basis of the programs and the data stored in the memory 1450. The non-volatile memory matrix 1460 stores therein: data read or written through the SAS port 1530 or the PCIe port 1540; and programs and data developed in the memory 1450. Note that the SAS control LSI 1410 and the PCIe control LSI 1420 may be configured as one LSI. In this case, both the PCIe and the SAS may perform data transfer using a $128b/130b$ encoding scheme.

The DKC 310 constructs a group of a redundant array of independent disks (RAID group) using the plurality of SAS drives on the basis of thin provisioning that is storage capacity virtualization technology, and constructs a storage pool from the RAID group. Consequently, the DKC 310 dynamically allocates a storage area to a virtual volume (VOL) provided to each physical server 220 and each operation client 120. Further, the DKC 310 constructs an external cache pool that is a storage pool using the H-SSDs 510, and creates an external cache area from the external cache pool. Note that the external cache pool may use an external cache RAID group (RG). The external cache area may be created in a storage area different from the storage pool.

The first drive casing 320 stores therein original data to be replicated to the second drive casing 330, according to a scheme with redundancy, such as RAID 1/5/6. Accordingly, for a reduction in storage capacity costs and simplified hardware, it is desirable that the second drive casing 330 stores therein external cache data that is a replica of the original data, according to a scheme without redundancy, such as RAID 0. If an error is detected in the replicated data stored in the second drive casing 330 by error detection or error correction, the error can be coped with by, for example, requesting the physical servers 220 to read data through the FC, transferring for a response the original data inside of the storage apparatus 210, or storing the original data into the second drive casing 330 again. This can significantly reduce costs compared with a case of storing data into an SSD using a scheme with redundancy. The costs can be further reduced by migrating the original data from a SAS layer to a layer with a lower bit cost (cost per unit storage capacity) such as a SATA layer or an NL-SAS (Near Line SAS) layer. The storage area cost for contents data having a large data volume in the present embodiment is high, and hence a reduction effect of this cost is remarkable. Further, in addition to the contents data, particular folders, particular virtual VOLs, and the like may also be replicated to the external cache area at a time. Examples of the replication targets in this case include data containing a plurality of contents that are released the current month.

Figure 7:
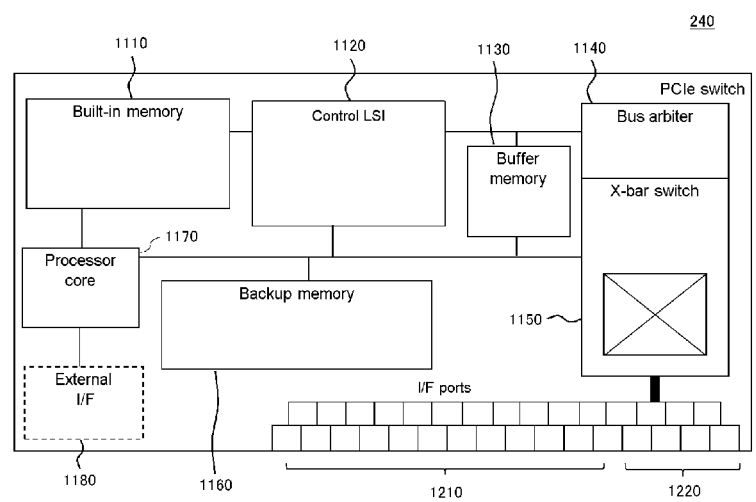
FIG. 7 illustrates a configuration of a PCIe switch 240.

FIG. 7 illustrates a configuration of the PCIe switch 240. The PCIe switch 240 is, for example, a PCIe switch that supports multi-root I/O virtualization (MR-IOV), and performs a virtualization switch process between the plurality of physical servers 220 and the plurality of PCIe-CTLs 530 in order to virtually share the second drive casing 330. The PCIe switch 240 includes a built-in memory 1110, a control large scale integration (LSI) 1120, a buffer memory 1130, a bus arbiter 1140, a cross (X)-bar switch 1150, a backup memory 1160, a processor core 1170, an external interface (I/F) 1180, a plurality of I/F ports 1210, and a plurality of I/F ports 1220. The built-in memory 1110 stores therein a routing table used for route control, a management table, and configuration information. The control LSI 1120 performs the virtualization switch process and the like. The buffer memory 1130 is a volatile memory, and stores therein exchanged data. The bus arbiter 1140 arbitrates rights transmitted between devices coupled to each other, and controls the X-bar switch 1150. The X-bar switch 1150 is a group of switches coupled between the I/F ports 1210 and the I/F ports 1220. The backup memory 1160 is a non-volatile memory, and stores therein backups of the management table and the configuration information. The processor core 1170 controls the respective parts of the PCIe switch 240. The external I/F 1180 is an I/F for communication with an external device. The plurality of I/F ports 1210 are respectively coupled to the plurality of physical servers 220. The I/F ports 1220 are coupled to the storage apparatus 210.

Figure 8:
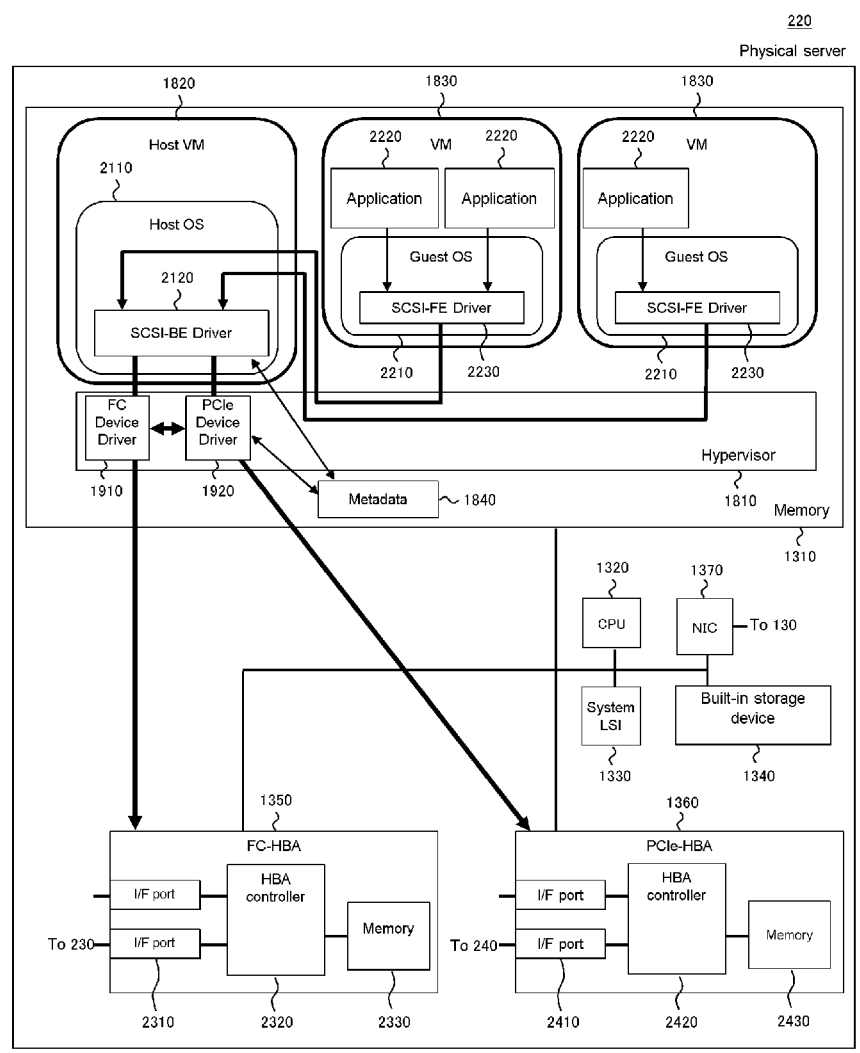
FIG. 8 illustrates a configuration of a physical server 220.

FIG. 8 illustrates a configuration of the physical server 220. The physical server 220 includes a memory 1310, a CPU 1320, a system LSI 1330, a built-in storage device 1340, an FC host bus adapter (FC-HBA) 1350, a PCIe-HBA 1360, and a network interface card (NIC) 1370 coupled to the WAN 130. The CPU 1320 implements a VM and the like on the basis of programs and data stored in the memory 1310. The memory 1310 further stores therein metadata received from the storage apparatus 210. The system LSI 1330 is coupled to the respective parts in the physical server 220, and controls communications therebetween. The built-in storage device 1340 is, for example, an HDD, and stores therein programs and data developed in the memory 1310. The FC-HBA 1350 includes an I/F port 2310, an HBA controller 2320, and a memory 2330. The I/F port 2310 is coupled to the SAN 230. The HBA controller 2320 controls communications on the basis of programs and data stored in the memory 2330. The memory 2330 further includes a local cache for communications. The PCIe-HBA 1360 includes an I/F port 2410, an HBA controller 2420, and a memory 2430. The I/F port 2410 is coupled to the PCIe switch 240. The HBA controller 2420 controls communications on the basis of programs and data stored in the memory 2430. The memory 2430 further includes a local cache for communications.

The memory 1310 stores therein a hypervisor 1810, a host VM 1820, a plurality of VMs 1830, and metadata 1840 received from the storage apparatus 210. The hypervisor 1810 is a virtual hardware recognized by the host VM 1820 and the plurality of VMs 1830, performs miscellaneous controls by mediating between each of these VMs and a physical hardware. The hypervisor 1810 includes an FC device driver 1910 and a PCIe device driver 1920. The host VM 1820 includes a host operating system (OS) 2110. The host OS 2110 includes a SCSI back-end (SCSI-BE) driver 2120. Each VM 1830 includes a guest OS 2210 and an application 2220. The guest OS 2210 includes a SCSI front-end (SCSI-FE) driver 2230. When the application 2220 sends an access request to the storage apparatus 210 by means of the SCSI-FE driver 2230, this request is sent to SCSI-BE driver 2120 through the hypervisor 1810. The SCSI-BE driver 2120 sends a request for an access to the storage apparatus 210 by means of any of the FC device driver 1910 or the PCIe device driver 1920. Depending on this request, the FC device driver 1910 controls the FC-HBA 1350, or the PCIe device driver 1920 controls the PCIe-HBA 1360. Various programs in computers such as the storage apparatus 210 and the host computers 730 may be installed on each computer by a program delivery server or a computer-readable storage medium.

Hereinafter, the metadata used by the computer system 100 is described. The storage apparatus 210 manages the metadata for associating a virtual address (a logical unit number (LUN) of a virtual VOL and virtual logical block addressing (LBA)) with an actually allocated address in the first drive casing 320 or the second drive casing 330. The DKC 310 creates a first table (FIG. 9) and a storage pool-based second table (FIG. 10) as the metadata for the first drive casing 320, and saves the two tables into the shared memory 460. The first table associates a virtual address with a storage area in a storage pool. The second table associates a storage area in a storage pool with an address. The DKC 310 creates a third table (FIG. 11) as the metadata for the second drive casing 330, and saves the third table into a metadata area in a system use area of the H-SSD 510. The third table associates a virtual address with an address in an external cache area. Only data that is copied from the storage pool to the external cache area is registered into the third table. Further, the PCIe-CTL 530 transfers the entirety or part of the third table to the physical server 220 through the PCIe, whereby the physical server 220 can refer to information in the third table and read data out of the external cache area through the PCIe.

FIG. 9 illustrates the first table. The first table includes entries for each block in a virtual VOL to which a storage pool is allocated. An entry of a given block includes a virtual apparatus ID 3110, a virtual VOL ID 3120, virtual LBA 3130, a block length 3140, a pool ID 3210, an entry start number 3220, a number of used entries 3230, an attribute flag 3240, a new allocation time 3250, and a SEQ flag 3260. The virtual apparatus ID 3110 is an identifier indicating a virtual storage apparatus including the given block. The virtual VOL ID 3120 is an identifier indicating a virtual VOL including the given block, and is, for example, a LUN. The virtual LBA 3130 is virtual LBA of the given block. The block length 3140 indicates the size of the given block. The pool ID 3210 is an identifier indicating a storage pool allocated to the given block. The entry start number 3220 is a number indicating an entry in a start page of the given block in the second table. The number of used entries 3230 indicates the number of used entries of the given block in the second table. The attribute flag 3240 indicates whether or not the given block is copied to an external cache area. For example, the attribute flag 3240 indicates attributes such as deleted, garbage collection completed, a hierarchical attribute (Tier number), an RW attribute (indicates whether the given block can be read or written), and a cache attribute (indicates whether the given block is cached). The new allocation time 3250 indicates the time at which a storage area is allocated from the storage pool to the given block. The SEQ flag 3260 indicates whether or not the given block is determined as sequential access data. The DKC 310 may manage an invalid area in the first table using another table.

FIG. 10 illustrates the second table. The second table includes entries for each unit page in a storage pool. An entry in a given page includes an entry number 3310, a page number 3320, a RAID group (Gr) number 3330, start LBA 3340, a block length 3350, an enablement flag 3410, a power saving state 3420, a number of SAS accesses 3430, a number of PCIe accesses 3440, and a last update time 3450. The entry number 3310 is a number that is given when the given page is allocated to a start position of a given block. The page number 3320 is a number of the given page. The RAID Gr number 3330 is a number of a RAID group to which the given page belongs. The start LBA 3340 is start LBA of the given page in the given RAID group. The block length 3350 indicates the size of consumed area in the given page. The enablement flag 3410 indicates whether or not the given page is enabled. The power saving state 3420 indicates a power saving state of a SAS drive to which the given page belongs. The number of SAS accesses 3430 indicates the number of accesses to the given page through the SAS. The number of PCIe accesses 3440 indicates the number of accesses to an external cache area corresponding to the given page, through the PCIe. The last update time 3450 indicates the last update time of the given page.

Figures 11, 12:
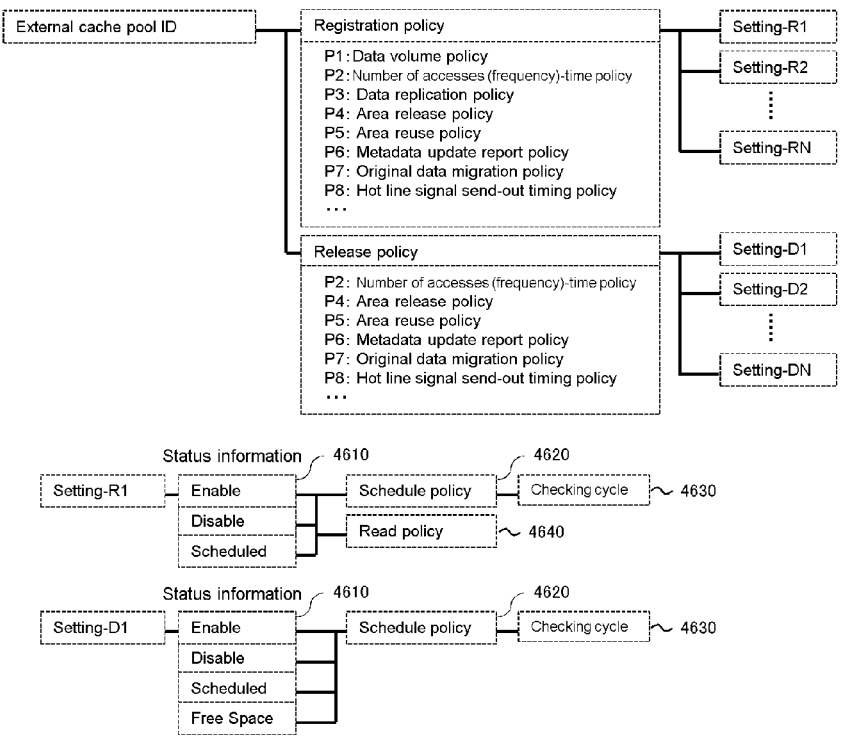
FIG. 11 illustrates a third table.
FIG. 12 illustrates an external cache area control policy.

FIG. 11 illustrates the third table. The third table includes entries for each block in a virtual VOL to which a storage area in an external cache area is allocated. An entry of a given block includes a virtual apparatus ID 3510, a virtual VOL ID 3520, virtual LBA 3530, a block length 3540, a RAID Gr number 3610, external cache area LBA 3620, an occupied block length 3630, an entry enablement flag 3640, and a number of PCIe accesses 3650. The virtual apparatus ID 3510, the virtual VOL ID 3520, and the virtual LBA 3530 are similar to the virtual apparatus ID 3110, the virtual VOL ID 3120, and the virtual LBA 3130, respectively. The block length 3540 indicates the size of the given block. The RAID Gr number 3610 is a number of a RAID group to which the given block belongs. The external cache area LBA 3620 is start LBA of a storage area allocated to the given block. The occupied block length 3630 indicates the size of the storage area allocated to the given block. The entry enablement flag 3640 indicates, for example, any of ALL, PAR, DEL, and GBC. ALL indicates the state where data is entirely copied. PAR indicates the state where data is partially copied or partially released. DEL indicates the state where the entry is disabled but its physical data remains undeleted and waits for garbage collection. GBC indicates a garbage collection completed state, and another data is written for reuse into the block. The number of PCIe accesses 3650 indicates the number of accesses to the storage area through the PCIe. The PCIe-CTL 530 updates the number of PCIe accesses 3650. When the DKC 310 refers to the number of PCIe accesses for the purpose of comparison with a policy, the DKC 310 reads the number of PCIe accesses 3650 out of the third table stored in the H-SSD 510, and updates the corresponding number of PCIe accesses 3440. Accordingly, the number of PCIe accesses 3650 indicates the latest value. The PCIe-CTL 530 may monitor the number of SAS accesses 3430. The entries of the third table are arranged in chronological order of registration, and may be rearranged in descending order of the number of PCIe accesses 3650, in order to increase the speed of garbage collection and the like.

The SEQ flag 3260 and the attribute flag 3240 may be managed in a table different from the first table. On the premise of thin provisioning environments, a plurality of entries may be created for one piece of large-volume data (a file and the like) into the second table. The DKC 310 puts the entries together, and registers the entries as one entry into the third table.

FIG. 12 illustrates an external cache area control policy. The DKC 310 replicates data to an external cache area and releases the external cache area according to the external cache area control policy. The external cache area control policy may be configured for each external cache pool ID, or may be configured on a second drive casing 330 basis, on a RAID group basis, or on a drive basis. The external cache area control policy includes a registration policy and a release policy. The registration policy includes child policies P1 to P8, and the release policy includes child policies P2 and P4 to P8. The registration policy may be selected for use from among a plurality of set values (Setting-R1 . . . ). The release policy may be selected for use from among a plurality of set values (Setting-D1 . . . ). Moreover, each Setting includes pieces of status information 4610 indicating an enabled status (Enable), a disabled status (Disable), a status where scheduled checking is performed (Scheduled), a status where the release policy is enabled if a free space of the external cache area falls below a threshold value (Free Space), and the like. Each Setting further includes: a schedule policy 4620 that is a set value of the child policy when scheduled checking is performed; and a checking cycle 4630 of the scheduled checking. Each Setting of the registration policy further includes a Read-time policy 4640 that is a set value of the child policy when checking is performed at the time of Read. Hereinafter, the child policies P1 to P8 are described. A particular condition corresponds to, for example, P1 and P2.

(P1) Data Volume Policy

P1 is determination conditions of the size of part of data that is continuously written, has a size equal to or larger than a size threshold value, and is determined as sequential access data (to which the SEQ flag 3260 in the first table is set), the part being to be replicated to the external cache area. In the case where this data satisfies the conditions of P1, the DKC 310 identifies a storage area occupied by this data, and defines the entirety or part of this data as a replication target to the external cache area. Normally, P1 is used as one of conditions combined with P2.

(P2) Number of Accesses (Frequency)-Time Policy

P2 is used in combination with a data replication policy of P3 and an area release policy of P4. According to P2, the number of accesses within a given period from the first Write is not counted. P2 includes replication conditions as conditions of P3 and release conditions as conditions of P4. The replication conditions and the release conditions each include a threshold value of the number of accesses and a cycle that change with time. In the case where the number of SAS accesses exceeds a threshold value of the replication conditions, the DKC 310 regards the entirety or part of the data as a target for replication to the external cache area. In the case where the number of PCIe accesses falls below a threshold value of the release conditions, the DKC 310 regards the entirety or part of the data as a target for deletion from the external cache area.

(P3) Data Replication Policy

In the case where the replication conditions of P2 are satisfied, P3 designates whether to replicate the entirety of data in the area occupied by the data that satisfies P1 or to replicate part thereof (partial copy). Further, in the case where the conditions of P2 are satisfied, P3 designates whether or not to collectively replicate folders and virtual VOLs including the occupied area. Further, in the case where the next access of access including the last block of data that has been copied to the external cache area is a particular address of the SAS, P3 designates whether or not to replicate a data group in a plurality of areas that are (estimated to be) fragmented.

(P4) Area Release Policy

In the case where the release conditions of P2 are satisfied, P4 designates whether to release the entirety of data in the area occupied by the data or to release part thereof (partial release). Further, in the case where the release conditions of P2 are satisfied, P4 designates whether or not to collectively release folders and virtual VOLs including the data. In the case where areas are estimated to be fragmented in P3, the DKC 310 also releases the areas.

(P5) Area Reuse Policy

P5 designates a garbage collection cycle that is an interval for executing a process of collecting released unused areas and securing a large unused area. Further, in the case where the total volume of the areas collected by the garbage collection is equal to or larger than a predetermined volume, P5 designates a volume threshold value for executing a defragmentation process.

(P6) Metadata Update Report Policy

P6 selects and designates a destination to which an update report message (status change report) is multicast, from among all the physical servers 220, a group of the physical servers 220, and one physical server 220. The external cache pool, the metadata, and the external cache area control policy are separated for each unit designated at this time.

(P7) Original Data Migration Policy

P7 designates whether or not to migrate the original of the data that is replicated to the external cache area according to P3, to a storage area in a lower layer of the first drive casing 320. Further, P7 designates whether or not to migrate the original of the data that is deleted from the external cache area according to P4, to a storage area in a designated layer of the first drive casing 320. However, in this case, the access frequency has already become lower, and hence the migration to the storage area in the designated layer (return to the original layer) may not be necessary in some cases.

(P8) Hot Line Signal Send-Out Timing Policy

P8 cannot be configured in a unit smaller than the casing. P8 configures a hot line signal send-out timing to, for example, any of the following cases.

(a) The hot line signal is sent out after the SAS-CTL 520 updates the third table.

(b) The hot line signal is sent out when the SAS-CTL 520 receives an XCOPY/WRITE_SAME (UNMAP bit=OFF) command. For WRITE_SAME (UNMAP bit=ON), the hot line signal is transmitted upon the reception of this command, regardless of this policy (because of its high degree of urgency).

Note that P8 may also configure the following case.

(c) The hot line signal is sent out when the SAS-CTL 520 receives the first Write command.

Figure 13:
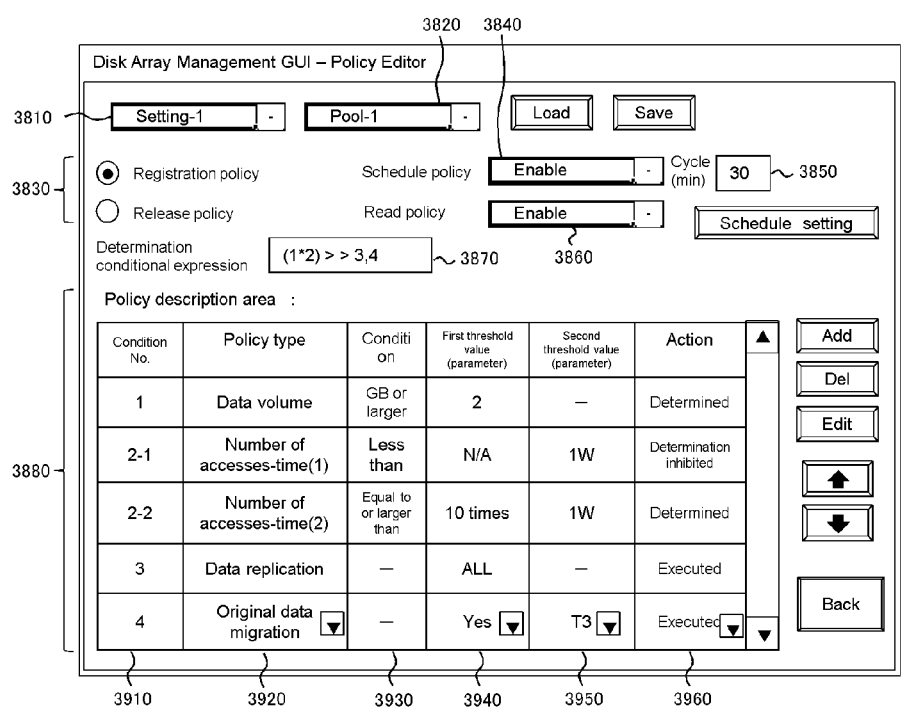
FIG. 13 illustrates a policy configuration screen.

FIG. 13 illustrates a policy configuration screen. The registration policy and the release policy are configured using a graphical user interface (GUI) such as this policy configuration screen. This policy configuration screen may be displayed on a display apparatus by the DKC 310, and may receive inputs from an input apparatus, or this policy configuration screen may be displayed on a display apparatus by the physical server 220, and may receive inputs from an input apparatus. The policy configuration screen includes: a Setting identifier input part 3810 indicating each Setting; a pool ID input part 3820; a policy type input part 3830 indicating any of the registration policy and the release policy; a schedule policy input part 3840 for inputting whether or not the schedule policy is enabled; a checking cycle 3850; a Read-time policy input part 3860 for inputting whether or not the Read-time policy is enabled; a determination conditional expression input part 3870 for inputting a combination of child policy conditions; and a policy description area 3880 for inputting child policy conditions. The policy description area 3880 indicates: a condition number 3910 that is a number of a given policy; a policy type 3920 indicating the type (for example, any of P1 to P8) of the given policy; a condition 3930 indicating an operator and the like of conditions of the given policy; a first threshold value 3940 used for the conditions; a second threshold value 3950 used for the conditions; and an action 3960 indicating whether or not determination and execution have been made according to the given policy. The policy configuration screen may be used not only to configure the policy but also to execute checking of a desired registration policy or release policy. When conditions in one Setting are defined on the policy configuration screen, conditions in another Setting may be loaded.

Hereinafter, an operation of the computer system 100 is described. It is assumed that access from the physical server 220 to the external cache area through the PCIe is only Read. As a result, because the access is not made through the SAS at the back end in the storage apparatus 210, consumption of a bandwidth of the SAS can be suppressed, and a hardware scale of the PCIe-CTL 530 can be suppressed.

Figure 14:
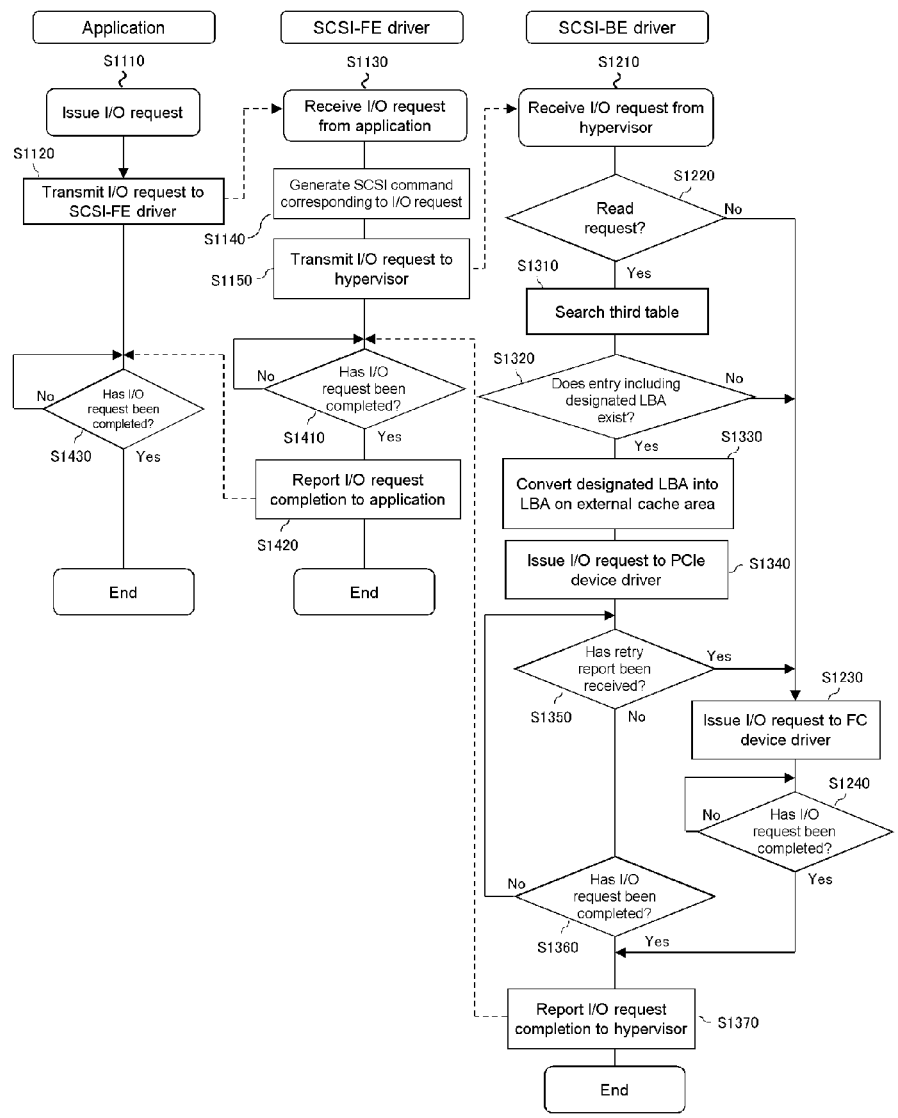
FIG. 14 illustrates an I/O request process by the physical server 220.

FIG. 14 illustrates an I/O request process by the physical server 220. This flow shows operations of the application 2220, the SCSI-FE driver 2230, and the SCSI-BE driver 2120. In the case where the target data of the I/O request by the physical server 220 exists in the external cache area, the SCSI-BE driver 2120 converts an address using the third table, and transfers the I/O request to the storage apparatus 210 through the PCIe. On the other hand, in the case where the target data does not exist in the external cache area, the SCSI-BE driver 2120 transfers the I/O request to the storage apparatus 210 through the FC.

The application 2220 issues the I/O request (S1110), and transmits the I/O request to the SCSI-FE driver 2230 (S1120). Upon the reception of the I/O request (S1130), the SCSI-FE driver 2230 generates a SCSI command corresponding to the I/O request (S1140), and transmits the I/O request (Hypercall) to the hypervisor 1810 that is virtual hardware (S1150). Upon the reception of the I/O request from the hypervisor 1810 (S1210), the SCSI-BE driver 2120 determines whether or not the I/O request is Read (S1220).

If the I/O request is not Read (S1220: No), the SCSI-BE driver 2120 issues the I/O request to the FC device driver 1910 (S1230), and determines whether or not the I/O request has been completed (S1240). If the I/O request has not been completed (S1240: No), the SCSI-BE driver 2120 repeats S1240. If the I/O request has been completed (S1240: Yes), the SCSI-BE driver 2120 moves the process to S1370.

If the I/O request is Read (S1220: Yes), the SCSI-BE driver 2120 refers to and searches the third table (S1310), and determines whether or not an entry including virtual LBA designated in the I/O request exists in the third table (S1320).

If this entry does not exist in the third table (S1320: No), the SCSI-BE driver 2120 moves the process to S1230. If this entry exists in the third table (S1320: Yes), the SCSI-BE driver 2120 converts, using the third table, the designated virtual LBA into LBA on the external cache area (S1330), and issues the I/O request to the PCIe device driver 1920 (S1340). After that, the SCSI-BE driver 2120 determines whether or not a retry report for the I/O request has been received (S1350).

If the retry report has been received (S1350: Yes), the SCSI-BE driver 2120 moves the process to S1230, and issues the command before the LBA conversion, to the FC device driver 1910. If the retry report has not been received (S1350: No), the SCSI-BE driver 2120 determines whether or not the I/O request has been completed (S1360). If the I/O request has not been completed (S1360: No), the SCSI-BE driver 2120 moves the process to S1350. If the I/O request has been completed (S1360: Yes), the SCSI-BE driver 2120 reports I/O request completion to the hypervisor 1810 (S1370), and ends the process.

After S1150, the SCSI-FE driver 2230 determines whether or not the I/O request has been completed (S1410). If the I/O request has not been completed (S1410: No), the SCSI-FE driver 2230 repeats S1410. If the I/O request has been completed (S1410: Yes), the SCSI-FE driver 2230 reports I/O request completion to the application 2220 (S1420), and ends the process.

After S1120, the application 2220 determines whether or not the I/O request has been completed (S1430). If the I/O request has not been completed (S1430: No), the SCSI-FE driver 2230 repeats S1430. If the I/O request has been completed (S1430: Yes), the SCSI-FE driver 2230 ends the process.

According to the I/O request process described above, with reference to the third table, the physical server 220 can make switching between a route through the FC and a route through the PCIe to transmit the I/O request to the storage apparatus 210.

Even if a host that does not use the SCSI-BE driver 2120 and makes communications using SOP is coupled to the storage apparatus 210 by mistake, the PCIe-CTL 530 that has received a Write request returns a check condition status indicating "write protect", whereby data destruction by the host can be prevented.

Figure 15:
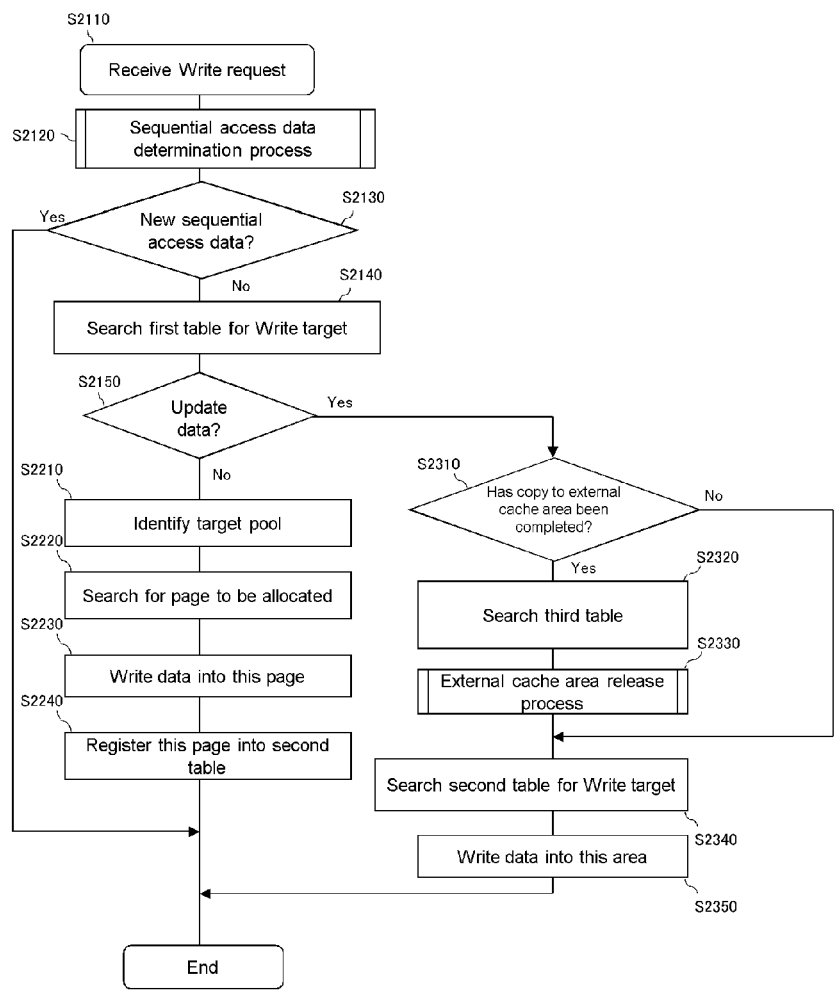
FIG. 15 illustrates a Write process.

FIG. 15 illustrates a Write process. The DKC 310 performs a Write process using thin provisioning. Upon the reception of a Write request from the physical server 220 as a host (S2110), the DKC 310 performs a sequential access data determination process on the target data of the Write request (S2120), and determines whether or not the result thereof is new sequential access data (S2130). If the result thereof is new sequential access data (S2130: Yes), the DKC 310 ends this flow. In this case, the DKC 310 writes the Write data according to a destage process. If the result thereof is not new sequential access data (S2130: No), the DKC 310 searches the first table for the virtual address of the Write target (S2140), and determines whether or not the Write data is update data (S2150). If the Write data is not update data (S2150: No), the DKC 310 identifies a target pool that is a storage pool into which the Write data is to be stored, on the basis of the virtual address of the Write target (S2210), and searches the target pool for a page to be allocated as an unused area (S2220). After that, the DKC 310 writes the Write data into this page (S2230), registers this page into the second table (S2240), and ends this flow.

If the Write data is update data (S2150: Yes), the DKC 310 determines whether or not the attribute flag 3240 of the Write target indicates completion of copy to the external cache area (S2310). If the attribute flag 3240 does not indicate the copy completion (S2310: No), the DKC 310 moves the process to S2340. If the attribute flag 3240 indicates the copy completion (S2310: Yes), the DKC 310 searches the third table to identify an entry of the Write target (S2320), and performs an external cache area release process on the identified entry (S2330). After that, the DKC 310 searches the second table to identify an entry of the Write target (S2340), writes the data into a page corresponding to the identified entry (S2350), and ends this flow. The details of S2310 to S2330 are described in a metadata update process in the storage apparatus. In this way, in the case where mismatching between original data and external cache data is caused by update, the external cache data can be deleted.

Figure 16:
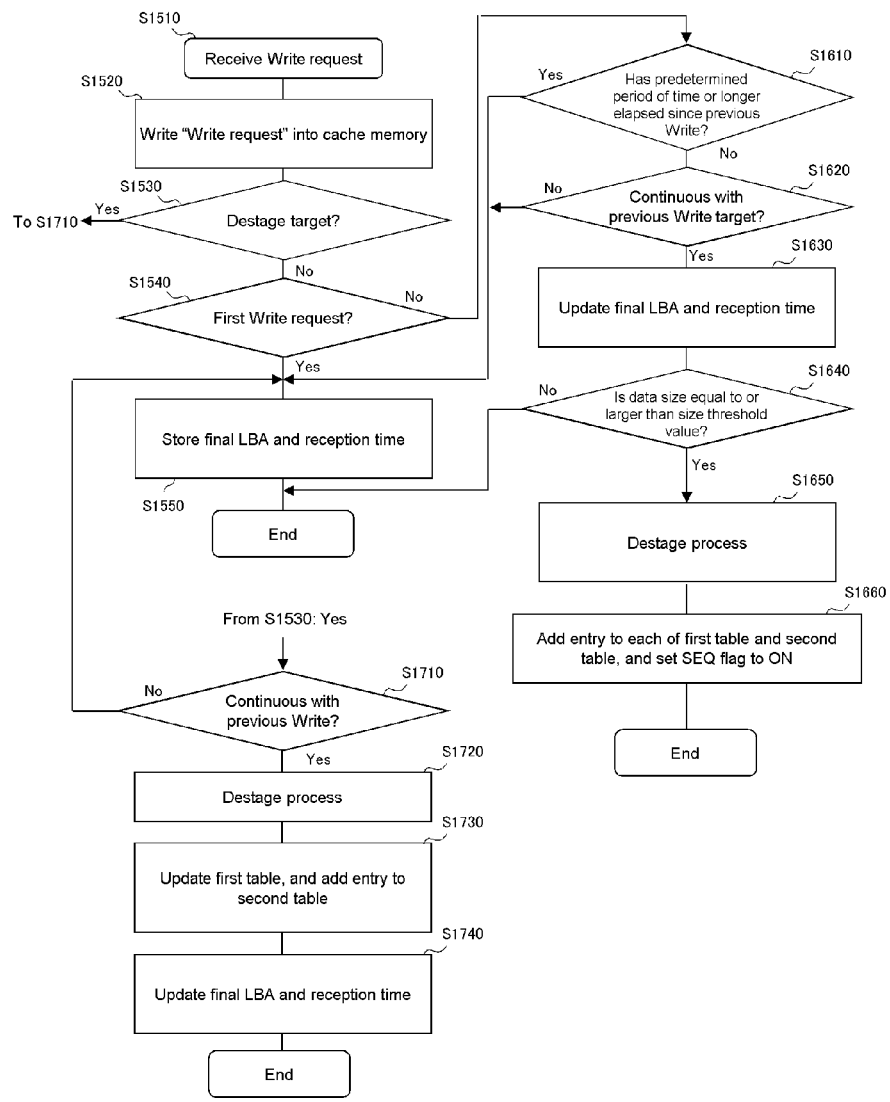
FIG. 16 illustrates a sequential access data determination process.

FIG. 16 illustrates the sequential access data determination process (S2120). A result of the sequential access data determination process is stored into the SEQ flag 3260. The sequential access data determination process gives the SEQ flag 3260 on a virtual VOL basis or on a storage pool basis.

Normally, a Write process of large-volume data is not finished at a time, but is performed dividedly a plurality of times (several tens to hundreds of times due to the large volume). Meanwhile, another data may be written by another higher-level apparatus in some cases. Accordingly, in the sequential access data determination process, the virtual address of the Write target is monitored for each physical server 220, and it is determined whether or not a Write request that is continuous with LBA of a Write request within a predetermined period of time in the past is received. In the case where the size of continuous Write data is equal to or larger than a size threshold value, the DKC 310 performs a process of purging (destaging) the data from the cache memory 430 with a higher priority, selects a RAID group, allocates a storage area continuous in the RAID group, and continues the Write operation. At this time, in the case where another Write data that is a destage target in the same storage pool exists, the DKC 310 selects another RAID group therefor, allocates a storage area, and writes the data thereinto. In the case where another large-volume data exists, the destage process on the large-volume data similarly occupies a RAID group other than the selected RAID group.

Upon the reception of a Write request from the physical server 220 (S1510), the DKC 310 writes the Write request into the cache memory 430, and makes a completion report to the physical server 220 (S1520). After that, the DKC 310 refers to the virtual address and the block length of the Write target, and determines whether or not the target data of the Write request is a destage target. If the target data thereof is a destage target (S1530: Yes), the DKC 310 moves the process to S1710. If the target data thereof is not a destage target (S1530: No), the DKC 310 determines whether or not the Write request is the first Write request to the Write target (S1540). If the Write request is the first Write request (S1540: Yes), the DKC 310 calculates final LBA from (the target LBA that is the virtual address of the Write target+the block length) for each virtual VOL, stores the final LBA and the reception time into the shared memory 460 (S1550), and ends this flow.

If the Write request is not the first Write request (S1540: No), the DKC 310 determines whether or not a predetermined period of time or longer has elapsed since the previous Write into the Write target (S1610). If the predetermined period of time or longer has elapsed (S1610: Yes), the DKC 310 moves the process to S1550. If the predetermined period of time has not elapsed (S1610: No), the DKC 310 determines whether or not the target LBA is continuous with the previous Write (the final LBA+1) (S1620). If the target LBA is not continuous with the previous Write (S1620: No), the DKC 310 moves the process to S1550. If the target LBA is continuous with the previous Write (S1620: Yes), the DKC 310 updates the final LBA on the basis of (the target LBA+the block length), and updates the final LBA and the reception time (S1630). After that, the DKC 310 determines whether or not the size of the Write data is equal to or larger than the size threshold value (S1640). If the size thereof is not equal to or larger than the size threshold value (S1640: No), the DKC 310 ends this flow. If the size thereof is equal to or larger than the size threshold value (S1640: Yes), the DKC 310 selects a RAID group, performs a destage process from the beginning of the Write data (S1650), adds an entry to each of the first table and the second table, sets the SEQ flag 3260 to ON (S1660), and ends this flow.

If Yes in S1530, the DKC 310 determines whether or not the target LBA is continuous with the previous Write target (the final LBA+1) (S1710). If the target LBA is not continuous with the previous Write target (S1710: No), the DKC 310 moves the process to S1550. If the target LBA is continuous with the previous Write target (S1710: Yes), the DKC 310 selects a RAID group, performs a destage process from the beginning of the target data (S1720), adds the block length of the target to the block length 3140 in the first table, adds an entry to the second table, and updates the last update time 3450 (S1730). After that, the DKC 310 updates the final LBA on the basis of (the target LBA+the block length), records the final LBA and the reception time (S1740), and ends this flow. Data that is left on the cache memory after the sequential access data determination process and is not sequential access data is destaged as appropriate in a normal destage process.

Normally, sequential access data such as moving image data is accessed only for Read once written. If the size threshold value is managed as a policy, in the case where the policy is inhibited and then enabled, it is impossible to determine thereafter whether or not data that is written during the inhibition period of the policy is sequential access data. Accordingly, the DKC 310 saves and manages the size threshold value in the shared memory 460 separately from policies, but the size threshold value may be managed as a policy.

If the physical server 220 dividedly writes one large-volume file into discontinuous LBA, fragmentation may occur. In such a case, it is difficult for the storage apparatus 210 of block-access type to discriminate whether or not the written data is one piece, and hence a determination error may occur in determination of the continuity at the time of Write. Accordingly, it is desirable that a client or the physical server 220 such as a file server control writing of large-volume data so as not cause fragments. Note that the DKC 310 may estimate whether or not target data is fragmented, on the basis of an access pattern at the time of Read, and may control whether or not to replicate the target data to the external cache area.

Figure 17:
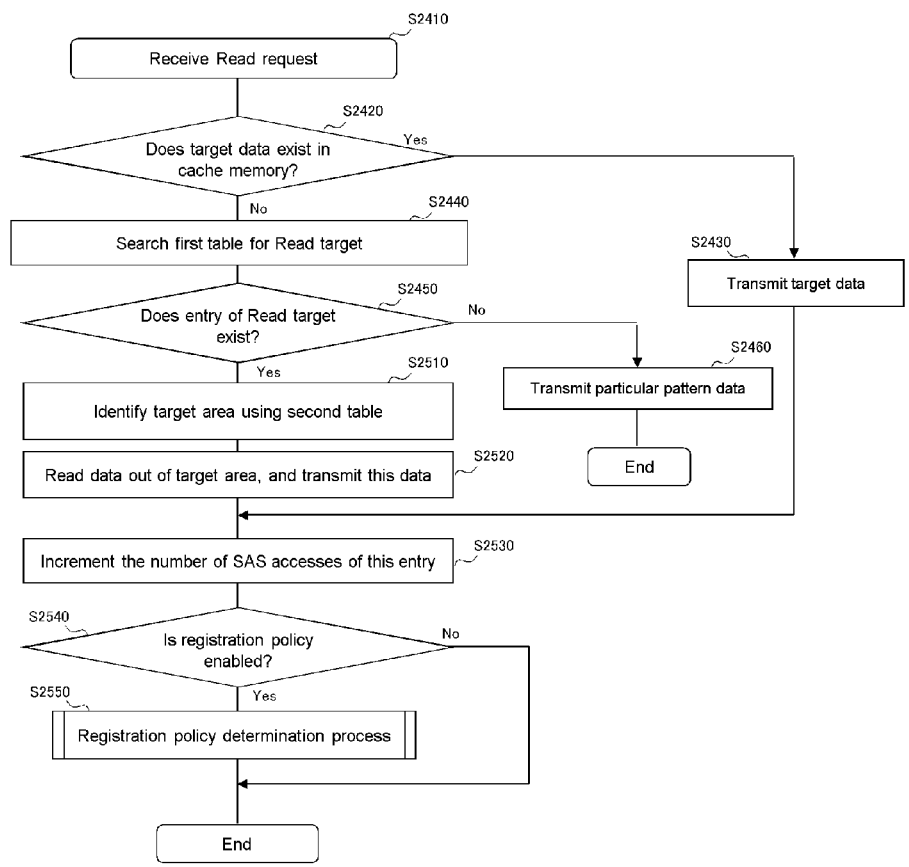
FIG. 17 illustrates a Read process.

FIG. 17 illustrates a Read process. The DKC 310 performs a Read process using thin provisioning. Upon the reception of a Read request from a host (S2410), the DKC 310 determines whether or not the target data of the Read request exists in the cache memory 430 (S2420). If the target data exists in the cache memory 430 (S2420: Yes), the DKC 310 transmits the target data in the cache memory 430 to the host (S2430), and moves the process to S2530.

If the target data does not exist in the cache memory 430 (S2420: No), the DKC 310 searches the first table for the virtual address of the Read target (S2440), and determines whether or not an entry of the Read target exists in the first table (S2450). If the entry of the Read target does not exist therein (S2450: No), the DKC 310 transmits particular pattern data (00h or the like) to the host (S2460), and ends this flow. If the entry of the target data exists therein (S2450: Yes), the DKC 310 searches the second table to identify a target area of this entry (S2510), reads data out of the target area, and transmits the read data to the host (S2520).

After that, the DKC 310 adds 1 to the number of SAS accesses 3430 of this entry in the second table (S2530), and determines whether or not the registration policy is enabled (S2540). If the registration policy is not enabled (S2540: No), the DKC 310 ends this flow. If the registration policy is enabled (S2540: Yes), the DKC 310 performs a registration policy determination process (S2550), and ends this flow.

In this system, it has been determined whether or not the write data is sequential access data in the write process. Accordingly, in the registration policy determination process in the Read process, for example, in the case where the Read target is sequential access data and satisfies the registration policy, even if part of data in large-volume file is accessed, the DKC 310 can perform an operation such as a copy the entire data in this file to the external cache area. This can enhance the responsiveness at the time of Read.

Hereinafter, a schedule policy determination process and a release policy determination process are described. The schedule policy determination process is executed in accordance with the schedule policy in Setting. The release policy is first checked, and the registration policy is then checked. The release of the external cache area is determined on the basis of the third table, and the registration thereof is determined on the basis of the first table.

Figure 18:
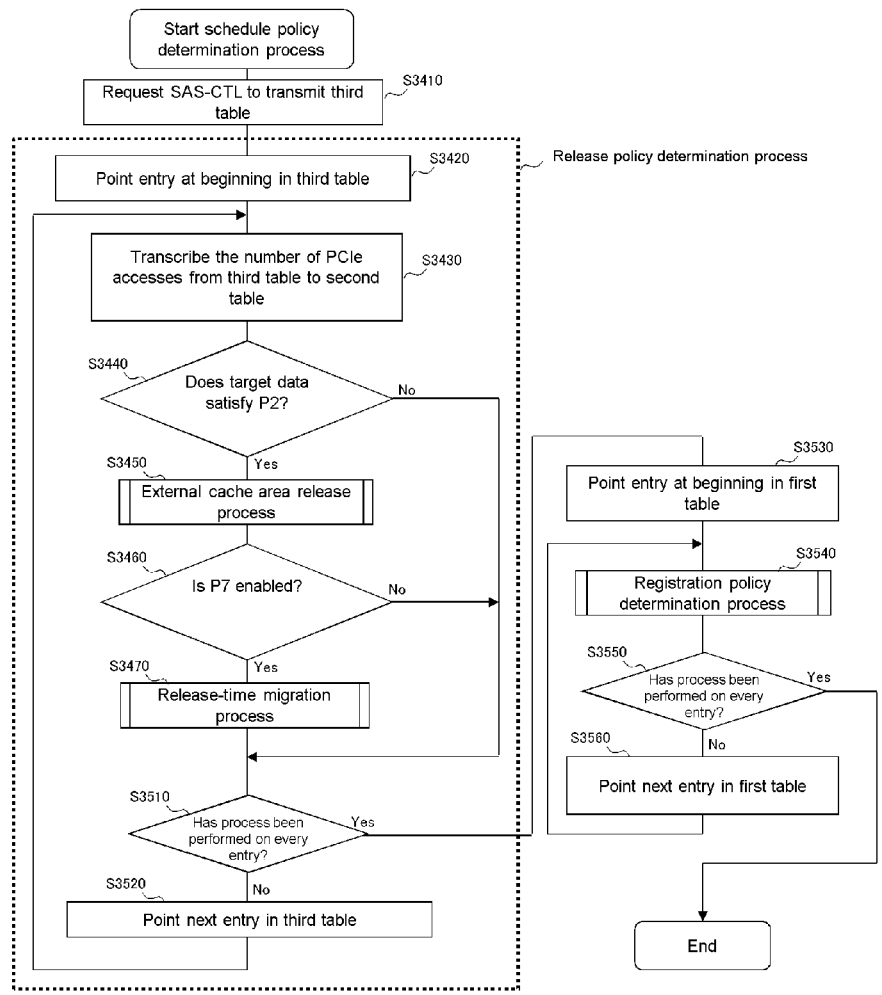
FIG. 18 illustrates a schedule policy determination process.

FIG. 18 illustrates the schedule policy determination process. In this flow, S3420 to S3520 show the release policy determination process. The DKC 310 requests the SAS-CTL 520 to transmit the third table (S3410), and points an entry at the beginning in the third table (S3420). After that, the DKC 310 transcribes the number of PCIe accesses 3650 of the pointed entry in the third table to the number of PCIe accesses 3440 in the second table (S3430), and determines by means of the third table whether or not the target data in the external cache area satisfies P2 (S3440).

If the target data does not satisfy P2 (S3440: No), the DKC 310 moves the process to S3510. If the target data satisfies P2 (S3440: Yes), the DKC 310 performs the external cache area release process (S3450), and determines whether or not P7 is enabled (S3460). If P7 is not enabled (S3460: No), the DKC 310 moves the process to S3510. If P7 is enabled (S3460: Yes), the DKC 310 performs a release-time migration process (S3470). Thereafter, the DKC 310 determines whether or not the process has been performed on every entry in the third table (S3510).

If the process has not been performed on every entry (S3510: No), the DKC 310 points the next entry in the third table (S3520), and moves the process to S3430. If the process has been performed on every entry (S3510: Yes), the DKC 310 points the entry at the beginning in the first table (S3530), performs the registration policy determination process on the pointed entry (S3540), and determines whether or not the process has been performed on every entry in the first table (S3550). If the process has been performed on every entry (S3550: Yes), the DKC 310 ends this flow. If the process has not been performed on every entry (S3550: No), the DKC 310 points the next entry in the first table (S3560), and moves the process to S3540.

According to the release policy determination process in the schedule policy determination process described above, data in the external cache area that satisfies the release conditions of P2 can be deleted. According to the schedule policy determination process, the registration policy determination process can be further performed on data in the storage pool. According to the schedule policy determination process, the registration and release of the external cache area are determined and performed on a regular schedule, whereby an optimum data arrangement can be maintained in accordance with a change in access frequency.

Figure 19:
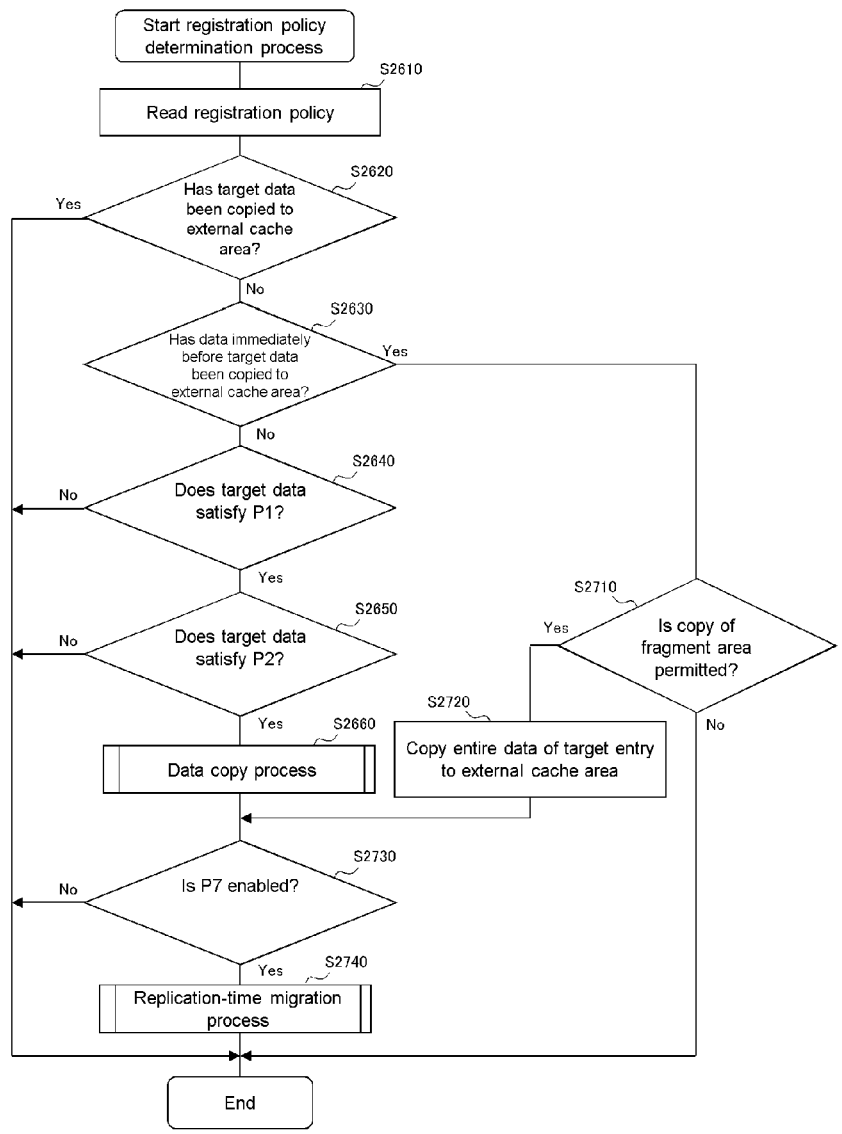
FIG. 19 illustrates a registration policy determination process.

FIG. 19 illustrates the registration policy determination process (S2550, S3540). In the schedule policy determination process, the DKC 310 recognizes the target entry of the target data in the first table. The DKC 310 reads the registration policy (Read-time policy) (S2610), refers to the attribute flag 3240 of the target entry in the first table, and determines whether or not the target data has been copied to the external cache area (S2620).

If the target data has been copied to the external cache area (S2620: Yes), the DKC 310 ends this flow. If the target data has not been copied to the external cache area (S2620: No), the DKC 310 determines whether or not data immediately before the target data has been copied to the external cache area (S2630). In this step, the DKC 310 determines Yes in the cases where a partial release process for the target entry is performed or where the target entry is fragmented and where the access frequency of the target entry and the free space of the external cache area satisfy predetermined conditions.

If the data immediately before the target data has been copied to the external cache area (S2630: Yes), the DKC 310 moves the process to S2710. If the data immediately before the target data has not been copied to the external cache area (S2630: No), the DKC 310 determines whether or not the target data satisfies P1, on the basis of the SEQ flag 3260 (S2640). In this determination, the DKC 310 determines Yes in the cases where the SEQ flag 3260 of the target entry is ON and where the block length 3140 thereof is equal to or larger than a size threshold value.

If the target data does not satisfy P1 (S2640: No), the DKC 310 ends this flow. If the target data satisfies P1 (S2640: Yes), the DKC 310 determines whether or not the target data satisfies P2 (S2650). In this determination, the DKC 310 determines Yes in the case where the number of SAS accesses 3430 for an elapsed time from the new allocation time 3250 of the target entry is equal to or larger than a predetermined threshold value.

If the target data does not satisfy P2 (S2650: No), the DKC 310 ends this flow. If the target data satisfies P2 (S2650: Yes), the DKC 310 performs a data copy process of copying the target data to the external cache area (S2660), and determines whether or not P7 is enabled (S2730).

If P7 is not enabled (S2730: No), the DKC 310 ends this flow. If P7 is enabled (S2730: Yes), the DKC 310 performs a replication-time migration process of migrating the target data (S2740), and ends this flow.

If Yes in S2630, the DKC 310 determines whether or not copy of a fragment area is permitted by P3 (S2710). If the copy thereof is not permitted (S2710: No), the DKC 310 ends this flow. If the copy thereof is permitted (S2710: Yes), the DKC 310 copies the entire data of the target entry to the external cache area (S2720), and moves the process to S2730.

According to the registration policy determination process described above, the DKC 310 can copy data in the storage pool that satisfies the registration policy, to the external cache area. Note that the need to use the external cache area is small in the Write process on a virtual VOL formed of only a lower-layer drive, and hence the registration policy determination process may be skipped.

Figure 20:
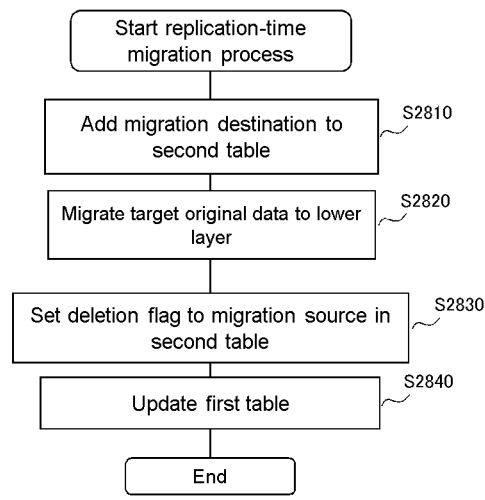
FIG. 20 illustrates a replication-time migration process.

FIG. 20 illustrates the replication-time migration process (S2740). The storage apparatus 210 according to the present embodiment receives a Read request to a target data copied to the external cache area, through the PCIe. Accordingly, the frequency of Read access to copy source data stored in the first drive casing 320 is lower. In view of this, in the replication-time migration process, the copy source data is migrated to a lower-layer memory apparatus having a lower reading speed in the hierarchical storage (for example, a SAS layer and a SATA layer), whereby an advantage in costs can be obtained.

The DKC 310 allocates a page of the migration destination, adds this page to the second table (S2810), and migrates target original data that is the original of the target data, to a layer lower than the current layer (S2820). After that, the DKC 310 sets a deletion (disablement) flag to a value of the enablement flag 3410 of a page of the migration source in the second table (S2830), updates the attribute flag 3240 and the entry start number 3220 in the first table (S2840), and ends this flow.

Figure 21:
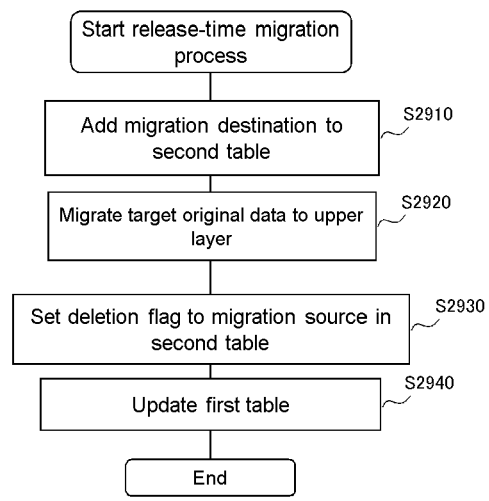
FIG. 21 illustrates a release-time migration process.

FIG. 21 illustrates the release-time migration process (S3470). In the release-time migration process, the copy source data (the original of the data stored in the external cache area and deleted from the external cache area) is migrated to an upper-layer memory apparatus having a higher reading speed in the hierarchical storage, whereby the response speed can be enhanced. The DKC 310 allocates a page of the migration destination, adds this page to the second table (S2910), and migrates target original data, to a layer upper than the current layer (S2920). After that, the DKC 310 sets a deletion (disablement) flag to a value of the enablement flag 3410 of a page of the migration source in the second table (S2930), updates the attribute flag 3240 and the entry start number 3220 in the first table (S2940), and ends this flow.

Figure 22:
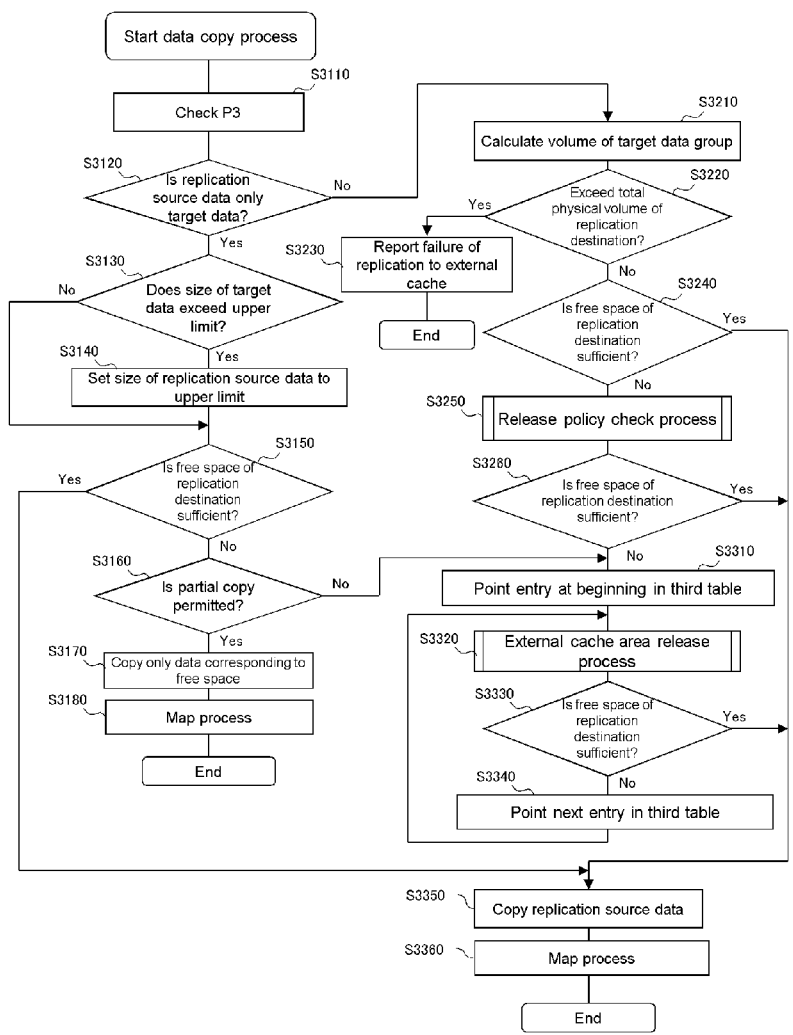
FIG. 22 illustrates a data copy process.

FIG. 22 illustrates the data copy process (S2660). The DKC 310 checks P3 (S3110), and determines whether or not replication source data designated by P3 is only the target data (S3120). In this step, the DKC 310 determines Yes in the case where the target data and the other data are not grouped together as a target data group by P3. Examples of the target data group include a virtual VOL, a file group, a folder, and related block data (for example, overlapping eliminated data). If the replication source data is not only the target data (S3120: No), the DKC 310 moves the process to S3210. If the replication source data is only the target data (S3120: Yes), the DKC 310 determines whether or not an upper limit of the size for replication is set and the size of the target data exceeds the upper limit (S3130). If No in S3130 (S3130: No), the DKC 310 moves the process to S3150. If Yes in S3130 (S3130: Yes), the DKC 310 sets a value of the size of the replication source data to the upper limit (S3140), and determines whether or not the free space of the external cache area that is the replication destination is sufficient (S3150).

If the free space is sufficient (S3150: Yes), the DKC 310 moves the process to S3350. If the free space is not sufficient (S3150: No), the DKC 310 determines whether or not partial copy is permitted by P3 (S3160). If the partial copy is not permitted (S3160: No), the DKC 310 moves the process to S3310. If the partial copy is permitted (S3160: Yes), the DKC 310 copies only data corresponding to the free space from the beginning of the target data to the replication destination (S3170), performs a map process of associating the replication destination with a virtual address, on only the copied data (S3180), and ends this flow. In the map process, the DKC 310 issues a SCSI command for a special operation to be described later to the SAS-CTL 520.

If No in S3120, the DKC 310 calculates the volume of the target data group (S3210), and determines whether or not the calculated volume exceeds the total physical volume of the external cache area (S3220). If the calculated volume exceeds the total physical volume of the external cache area (S3220: Yes), the DKC 310 reports failure of the replication to the external cache area, to the physical server 220 (S3230), and ends this flow. If the calculated volume does not exceed the total physical volume of the external cache area (S3220: No), the DKC 310 determines whether or not the free space of the external cache area is sufficient (S3240). If the free space of the external cache area is sufficient (S3240: Yes), the DKC 310 moves the process to S3350. If the free space of the external cache area is not sufficient (S3240: No), the DKC 310 performs the release policy determination process involving a release process of the external cache area (S3250), and determines whether or not the free space of the external cache area is sufficient again (S3260).

If the free space of the external cache area is sufficient (S3260: Yes), the DKC 310 moves the process to S3350. If the free space of the external cache area is not sufficient (S3240: No), the DKC 310 points an entry at the beginning in the third table (S3310), performs the external cache area release process (S3320), and determines whether or not the free space of the external cache area is sufficient (S3330). Here, because the entries in the third table are arranged in chronological order, the entry at the beginning is the oldest. If the free space of the external cache area is sufficient (S3330: Yes), the DKC 310 moves the process to S3350. If the free space of the external cache area is not sufficient (S3330: No), the DKC 310 points the next entry in the third table (S3340), and moves the process to S3320. In this step, if possible, the DKC 310 may copy part of the target data group to the replication destination.

If Yes in S3150, S3240, S3260, or S3330, the DKC 310 copies the target data or the target data group that is the replication source data, to the replication destination (S3350), performs the map process (S3360), and ends this flow. In S3350, the DKC 310 may divide for copy one continuous piece of data into a plurality of pieces of data. Further, at the time of the copying, the DKC 310 may delete redundant data such as parity data, and copy only actual data. Further, for example, in the case where the original data is stored according to RAID 6 or RAID 1, the DKC 310 may copy the data to a replication destination of RAID 5, which is a scheme that is lower in reliability and redundancy but advantageous in costs.

According to the data copy process described above, only data corresponding to the free space from the beginning of the target data is partially copied. Accordingly, the sizes of areas of the external cache can be made equal to each other, and only beginning portions of many files can be copied to the external cache, the beginning portions having a higher access frequency. Further, if the free space of the external cache area is not sufficient, older blocks in the external cache area are released in order, whereby data can be copied when a sufficient free space is secured in the external cache area.

Figure 23:
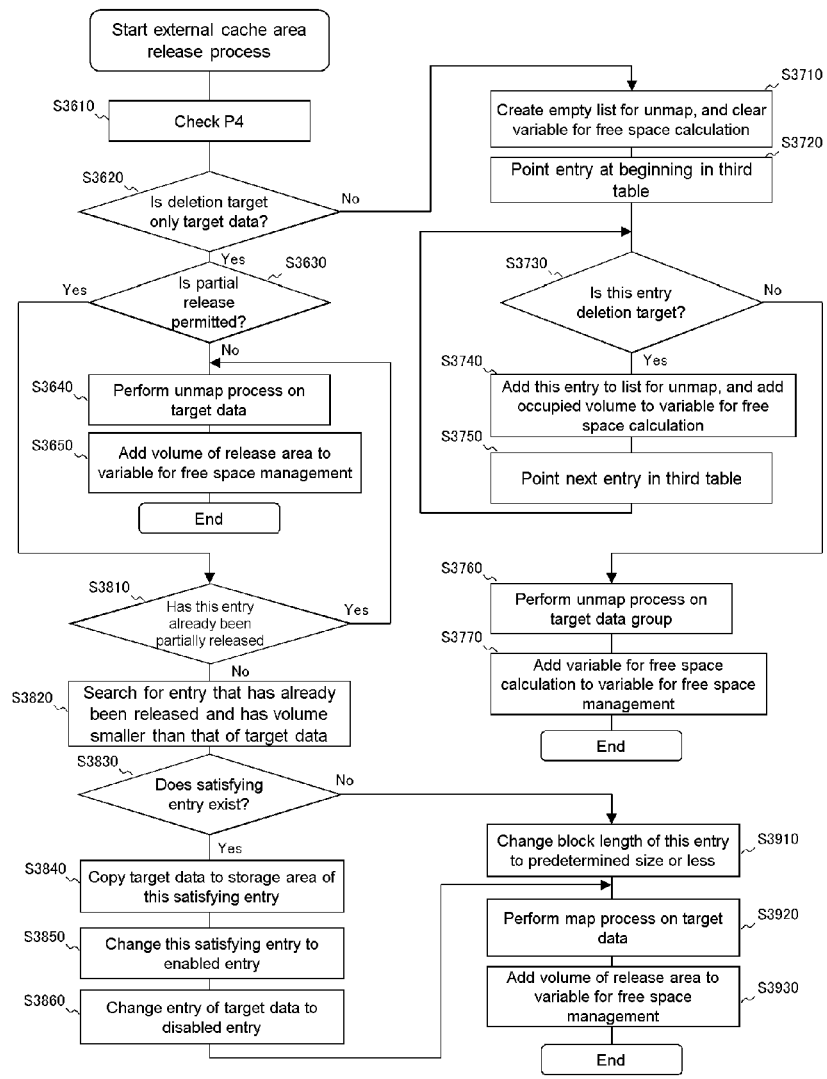
FIG. 23 illustrates an external cache area release process.

FIG. 23 illustrates the external cache area release process (S3450, S3320). In the external cache area release process, the DKC 310 releases the external cache area on the basis of metadata and a policy. The PCIe-CTL 530 may request the DKC 310 through the SAS-CTL 520 to release the external cache area, with the use of a hot line signal and the status register.

The DKC 310 checks P4 (S3610), and determines whether or not the release target is only the target data (S3620). In this step, the DKC 310 determines Yes in the case where the target data and the other data are not grouped together as a target data group by P4. If the release target is not only the target data (S3620: No), the DKC 310 moves the process to S3710. If the release target is only the target data (S3620: Yes), the DKC 310 determines whether or not partial release is permitted (S3630). If the partial release is permitted (S3630: Yes), the DKC 310 moves the process to S3810. If the partial release is not permitted (S3630: No), the DKC 310 performs an unmap process of deleting or disabling an entry of the target data in the third table to thereby release the external cache area (S3640), adds the volume of the release area to a variable for free space management in the shared memory 460 (S3650), and ends this flow. In the unmap process, the DKC 310 issues a SCSI command instructing the special operation similar to that in the map process, to the SAS-CTL 520.

If No in S3620, the DKC 310 creates an empty list for unmap (a deletion list), clears a variable for free space calculation in the shared memory 460 (S3710), points an entry at the beginning in the third table (S3720), and determines whether or not this entry is the release target (S3730). If this entry is not the release target (S3730: No), the DKC 310 moves the process to S3760. If this entry is the release target (S3730: Yes), the DKC 310 adds this entry to the list for unmap, adds the volume occupied by this entry to the variable for free space calculation (S3740), points the next entry in the third table (S3750), and moves the process to S3730.

If No in S3730, the DKC 310 performs the unmap process on the target data group (S3760), adds the variable for free space calculation to the variable for free space management (S3770), and ends this flow.

If No in S3630, the DKC 310 determines whether or not this entry has already been partially released in the past (S3810). If this entry has already been partially released in the past (S3810: Yes), the DKC 310 moves the process to S3640. Consequently, if this entry has already been partially released, the DKC 310 releases the entire data of this entry, and does not perform further partial release. If this entry has not already been partially released in the past (S3810: No), the DKC 310 searches the third table for an entry satisfying conditions of having already been released and having a volume smaller than that of the target data (S3820), and determines whether or not an entry satisfying the conditions exists (S3830). If this satisfying entry exists (S3830: Yes), the DKC 310 copies part of the target data corresponding to the volume of a storage area of this satisfying entry, to the storage area (S3840), changes this satisfying entry to an enabled entry in the third table (S3850), and changes the entry of the target data to a disabled entry and garbage collection completed (S3860), to thereby perform an equivalent operation to deleting part of the data from the end of the target data. After that, the DKC 310 performs a map process of updating the entry of the target data (S3920), adds the volume of the release area obtained in S3840 to S3860 or S3910 to the variable for free space management (S3930), and ends this flow.

If this satisfying entry does not exist in S3830 (S3830: No), the DKC 310 changes the block length of this entry to a predetermined size or less, to thereby release part of the area from the end of the block (S3910), and moves the process to S3920.

According to the external cache area release process described above, if a released area satisfying the conditions exists in the third table, the target data is partially copied with a higher priority to the released area, and the copy source area is entirely released, whereby efficient garbage collection can be performed. Further, even if a released area satisfying the conditions does not exist, a portion after a predetermined size of the target data is released. Accordingly, the sizes of areas of the external cache can be made equal to each other, and only beginning portions of many files can be left, the beginning portions having a higher access frequency, and the other areas can be released.

Figure 24:
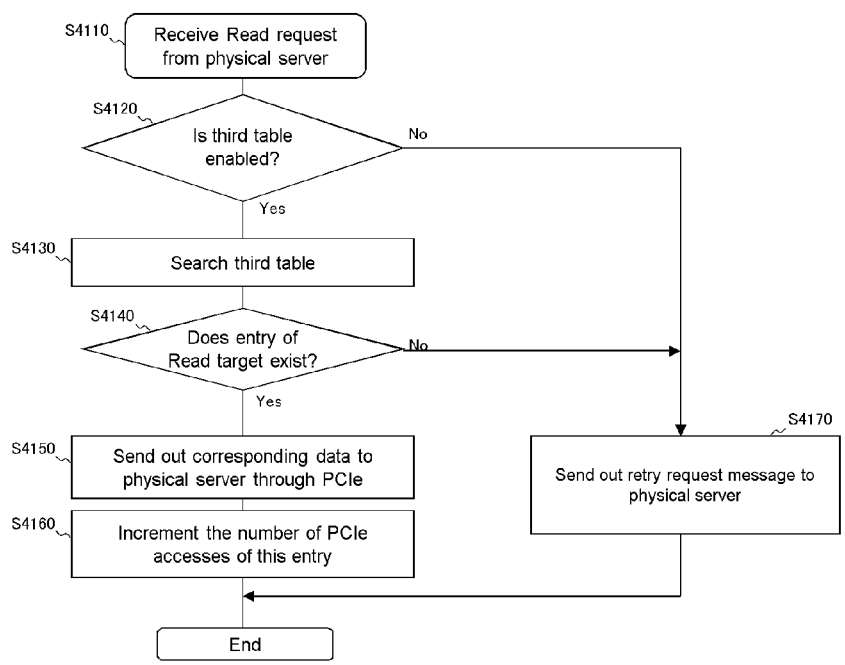
FIG. 24 illustrates a Read process through PCIe.

FIG. 24 illustrates a Read process through the PCIe. In the case where the data copy process is performed on a given file and where the third table is sent to the physical server 220, a Read request of the given file through the PCIe is issued. Upon the reception of the Read request from the physical server 220 (S4110), the PCIe-CTL 530 determines whether or not the third table is enabled (S4120). If the third table is not enabled (S4120: No), the PCIe-CTL 530 sends out a retry request message (indicating, for example, an error that cannot be corrected by hardware but is not fatal) to the physical server 220 (S4170), and ends this flow.

If the third table is enabled (S4120: Yes), the PCIe-CTL 530 searches the third table on the basis of the virtual address of the Read target designated in the Read request (S4130), and determines whether or not an entry of the Read target exists (S4140). If the entry of the Read target does not exist (S4140: No), the PCIe-CTL 530 moves the process to S4170. If the entry of the Read target exists (S4140: Yes), the PCIe-CTL 530 reads Read data corresponding to this entry, sends out the Read data to the physical server 220 through the PCIe (S4150), adds 1 to the number of PCIe accesses 3650 of this entry in the third table (S4160), and ends this flow.

According to the Read process through the PCIe described above, in the case where the third table is not enabled or where an entry corresponding to the Read request does not exist, the retry request message is transmitted to the physical server 220, whereby the physical server 220 can perform, for example, a process of switching to a route through the FC.

Figure 25:
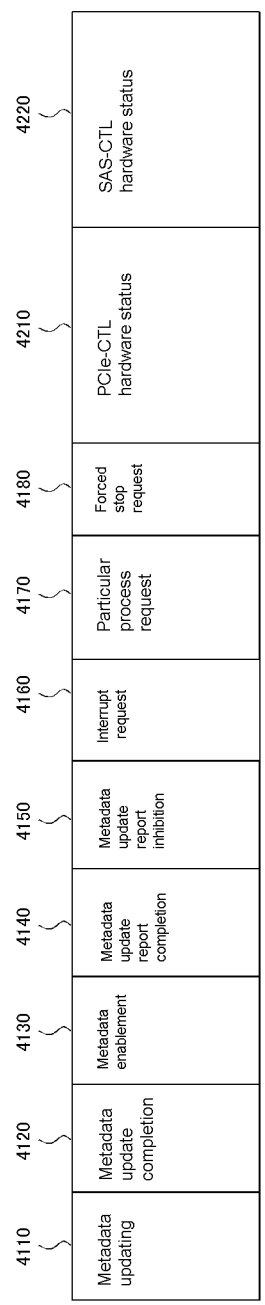
FIG. 25 illustrates functional bits in a status register.

FIG. 25 illustrates functional bits in a status register. The SAS-CTL 520 that has received a Write request to the H-SSD 510 and the like from the DKC 310 reports as needed the reception to the PCIe-CTL 530 using a hot line signal, and sets a predetermined bit of the status register. For example, update of the third table is essential to writing from the DKC 310 into the H-SSD 510, and hence the update is reported in advance. Note that hot line signal send-out timing follows P8. The status register includes a metadata updating bit 4110, a metadata update completing bit 4120, a metadata enabling bit 4130, a metadata update report inhibiting bit 4150, an interrupt requesting bit 4160, a particular process requesting bit 4170, a forced stop requesting bit 4180, and a SAS-CTL hardware status 4220, which are set by the SAS-CTL 520, and also includes a metadata update report completing bit 4140 and a PCIe-CTL hardware status 4210, which are set by the PCIe-CTL 530.

If the forced stop requesting bit 4180 is set to ON, the PCIe-CTL 530 stops operating. The particular process requesting bit 4170 is a bit string, and a predetermined particular process request is made in accordance with the contents of the bit string. For example, the particular process requesting bit 4170 is used to instruct the PCIe-CTL 530 to perform a defragmentation process in the external cache area or self-diagnosis. The PCIe-CTL hardware status 4210 and the SAS-CTL hardware status 4220 are used to discriminate statuses (normal or abnormal, process being executed (BUSY), an operation mode, and the like) of the PCIe-CTL 530 and the SAS-CTL 520, respectively. An operation of updating the third table using the other functional bits is described later.

FIG. 26 illustrates special operations according to SCSI commands. This table shows: SCSI commands issued from the DKC 310 to the SAS-CTL 520; functions and the like of the SAS-CTL 520 according to these commands; states and the like of the PCIe-CTL 530 according to these commands; and states of the status register according to these commands, for respective command numbers C1 to C7. A WRITE_SAME command of C1 in which an UNMAP bit is set to ON disables a designated area on the third table. A WRITE_SAME command of C2 in which an UNMAP bit is set to OFF releases a designated area on the third table. WRITE (16) or WRITE (10) of C3 stores data to a designated area, adds an entry to the third table, and updates an LBA range. EXTENDED COPY (XCOPY) of C4 performs a map process of associating the virtual VOL ID 3520 and the virtual LBA 3530 with an entry added in C3 or a new entry. This command is also used for an unmap process of releasing the external cache area. MODE_SELECT (10) of C5 designates a special page, does not update the third table, and transmits RAID group configuration information and the like. MODE_SENSE (10) of C6 designates a special page, and performs configuration information reading, metadata reading, and the like. SEND_DIAGNOSTIC of C7 performs diagnosis, firmware update, forced stop of the PCIe-CTL 530, and the like. For example, the DKC 310 performs a map process of associating a storage area in the storage pool with a given virtual address using thin provisioning and associating a storage area in the external cache area with the given virtual address using the XCOPY command.

The DKC 310 issues a command of a special operation to the SAS-CTL 520 in order to facilitate discrimination from a command of a normal operation to the drives (H-SSDs 510). The special operation is not executed in the case where the PCIe-CTL 530 is not coupled (mounted). For example, the SAS-CTL 620 of the first drive casing 320 not including the PCIe-CTL 530 performs only a normal operation on the drives (the SAS-HDDs 611 and the SATA-HDDs 612) according to C1 to C3. The SAS-CTL 520 includes an independent SAS address therefor. This SAS address may be used in common with a SAS address for SAS enclosure services (SES). Note that the WRITE command of C3 may be transmitted from the DKC 310 directly to each drive. In this case, the SAS-CTL 520 monitors this command to thereby create an entry in the third table and perform address conversion between LBA in the external cache area and virtual LBA. The command of C1 is issued on a drive (H-SSD 510) basis, and hence the command needs to be issued a plurality of times in order to release an area of a large-volume file, which takes time. Accordingly, it is desirable that the DKC 310 issue C1 with designation of the drive that stores therein data of LBA at the beginning of this file, as well as the LBA, to thereby release an entry including this area in the third table using one command.

Further, for example, a READ command may be used to read the third table, in place of the MODE_SENSE command of C6. Further, instead of creating an entry in the third table upon the reception of the WRITE command of C3, the creation of an entry in the third table and the map process may be performed at the same time upon the reception of the XCOPY command of C4. In order to facilitate searching of the third table for this entry, the third table may store therein the LBA at the beginning of the large-volume file in the external cache area.

FIG. 27 illustrates the XCOPY command for the map process. FIG. 27 illustrates a command descriptor block (CDB), the formats of descriptors, and examples of the descriptors, in the XCOPY command for the map process. In the CDB, 1- to 9-byte positions are used to designate a third table in the case where a plurality of the third tables exist, and part of a 15-byte position is used as the metadata update report inhibiting bit 4150. Among the descriptors, Source Target Descriptor is used to designate the external cache area (a casing identifier of the second drive casing 330 and an external cache RG or LUN). Destination Target Descriptor is used to designate an identifier of a virtual storage apparatus and a LUN of a virtual VOL. Segment Descriptor is used to designate start LBA on an external cache RAID group, designate start LBA on a virtual VOL corresponding to the area, and designate the number of blocks allocated to the LBA. Here, Read and Write are not carried out. Further, a plurality of virtual addresses can be associated with the same LBA in the external cache area.

FIG. 28 illustrates descriptor type codes in the XCOPY command for the map process. This table shows contents and a mapping target associated with the target for each target type code. A storage apparatus other than its own apparatus can be designated as the target device by a descriptor type code defined in the SCSI and an identifier according the type. The DKC 310 according to the present embodiment designates, as the mapping target, an identifier (virtual LUN) of a virtual storage apparatus provided by its own storage apparatus 210, for a portion to be used as an identifier of another storage apparatus, whereby not only a mere virtual VOL but also the virtual storage apparatus can be associated. Among the target type codes, E0, E1, and E2 each associate the target with a virtual LUN provided through the FC. E4 associates the target with an internal LUN and the like. E5 associates the target with a virtual LUN provided through an internet protocol (IP). E9 associates the target with a virtual LUN provided through the SAS. EA associates the target with a virtual LUN provided through the IP. Note that a method of performing the map process using the XCOPY command is described here, but the present invention is not limited thereto, and the map process may be performed using a given user-defined command.

Hereinafter, description is given of the metadata update process in the storage apparatus, in which the third table in the storage apparatus 210 is updated using a SCSI command, and the corresponding metadata update process in the physical server, in which the third table in the physical server 220 is updated.

FIG. 29 illustrates the metadata update process in the storage apparatus. This flow shows operations of the DKC 310, the SAS-CTL 520, and the PCIe-CTL 530, for the update of the third table. The DKC 310 issues any of the SCSI commands of special operations to the SAS-CTL 520 (S5110), and determines whether or not data transfer is necessary (S5120). If the data transfer is not necessary (S5120: No), the DKC 310 ends this flow. If the data transfer is necessary (S5120: Yes), the DKC 310 transmits Write data to the SAS-CTL 520 (S5130). After that, the DKC 310 determines whether or not transmission of the entire data has been completed (S5140). If the transmission of the entire data has not been completed (S5140: No), the DKC 310 moves the process to S5130 and repeats the process from S5130. This case (S5140:No) occurs when the command issued by S5110 is WRITE (16) or WRITE (10). If the transmission of the entire data has been completed (S5140: Yes), the DKC 310 issues the XCOPY command for the map process to the SAS-CTL 520 (S5150), and ends this flow.

The SAS-CTL 520 determines whether or not the SCSI command received in S5110 is a particular process request such as MODE_SELECT (S5310). If the SCSI command received in S5110 is a particular process request (S5310: Yes), the SAS-CTL 520 transmits the particular process request to the PCIe-CTL 530 using a hot line signal and the status register (S5440), and moves the process to S5450. If the SCSI command received in S5110 is not a particular process request (S5310: No), in the case where the SCSI command is WRITE_SAME (UNMAP bit=ON), the SAS-CTL 520 sets a value to the particular process requesting bit 4170 (S5320), and transmits a hot line signal to the PCIe-CTL 530 (S5330). After that, the SAS-CTL 520 determines whether or not a Write request is issued to the H-SSD 510 (S5340). If the Write request is not issued (S5340: No), the SAS-CTL 520 moves the process to S5410. If the Write request is issued (S5340: Yes), the SAS-CTL 520 writes data into the H-SSD 510 in response to the Write request, and creates an entry of this data in the third table (S5350). After that, the SAS-CTL 520 updates the third table such that an area designated in the XCOPY command received in S5150 is released (S5410), and sets the metadata update completing bit 4120 to ON (S5420). In the case where the SCSI command is WRITE_SAME (UNMAP bit=OFF) or XCOPY, the SAS-CTL 520 transmits a hot line signal to the PCIe-CTL 530 (S5440). After that, the SAS-CTL 520 transmits a completion status to the DKC 310 (S5450), and ends this flow.

The PCIe-CTL 530 reads the status register in response to the command received in S5310 (S5510), and determines whether or not the third table is enabled (the metadata enabling bit 4130 is ON) (S5520). If the third table is enabled (S5520: Yes), the PCIe-CTL 530 moves the process to S5550. If the third table is not enabled (S5520: No), in the case where the SCSI command is WRITE_SAME (UNMAP bit=ON), the metadata updating bit 4110 and the interrupt requesting bit 4160 are assumed to be ON, and upon the reception of a Read request from the physical server 220 through the PCIe (S5530), the PCIe-CTL 530 transmits a retry request message to the physical server 220 through the PCIe (S5540). As a result, the physical server 220 temporarily switches transmission of the Read request to a route through the FC. This corresponds to, for example, the case where the physical server 220 makes a request to update or delete original data that has been copied to the external cache area and where the external cache area thus needs to be urgently disabled. Further, the PCIe-CTL 530 receives a request normally in the state where the metadata enabling bit 4130 is ON. This corresponds to, for example, the case where data is newly written into the external cache area or where data having a low access frequency is completely or partially released from the external cache area and the resultant area is released to be reused. In the former case, a new entry is merely added to the third table, and hence the PCIe-CTL 530 can use the third table before its update. In the latter case, the corresponding entry is deleted from the third table, or information (an LBA range and the like) on the entry is changed. Even during the update of the third table or immediately after its update, data of this area remains until the next update of (new entry addition to) the third table, and hence the PCIe-CTL 530 can continue an operation including reading the data of this area using the third table before its update.

After that, the PCIe-CTL 530 reads the status register (S5550), and determines whether or not the update of the third table has been completed (the metadata update completing bit 4120 is ON) (S5560). If the update of the third table has not been completed (S5560: No), the PCIe-CTL 530 moves the process to S5530. If the update of the third table has been completed (S5560: Yes), the PCIe-CTL 530 moves the process to S5610.

In response to the command received in S5440, the PCIe-CTL 530 reads the third table after its update, out of the H-SSD 510 (S5610). If the metadata update report inhibiting bit 4150 is OFF, the PCIe-CTL 530 multicasts an update report message to the effect that the third table has been updated, to the PCIe-HBAs 1360 of all the physical servers 220 coupled to the PCIe-CTL 530, through the PCIe (S5620). In this step, the PCIe-CTL 530 may multicast the message to a group of physical servers 220 designated in advance. A condition of this report follows the metadata update report policy (P6) described above. After that, the PCIe-CTL 530 sets the metadata update report completing bit 4140 to ON (S5630), transmits a hot line signal to the SAS-CTL 520 (S5640), and ends this flow.

The PCIe-CTL 530 checks the status register by polling or the like. If the SAS-CTL 520 sets the metadata update completing bit 4120 to ON, the PCIe-CTL 530 reads the third table after its update out of the metadata area, and updates the third table on the memory 1730. Note that the SAS-CTL 520 may follow P8 and transmit a hot line signal after update completion of the third table. In this case, the PCIe-CTL 530 can update the third table immediately after the reception of the hot line signal. Further, the SAS-CTL 520 may report only an updated portion of the third table to the PCIe-CTL 530. Similarly, the PCIe-HBA 1360 may receive the report of the updated portion to update an updated portion of the third table in the physical server 220. Further, the PCIe-CTL 530 and the SAS-CTL 520 may exchange information indicating the updated portion, using a hot line signal. The PCIe-CTL 530 and the SAS-CTL 520 may implement processing similar to the status register by, for example, delivering a value corresponding to each functional bit of the status register with the use of a particular area in the H-SSD 510.

Figure 30:
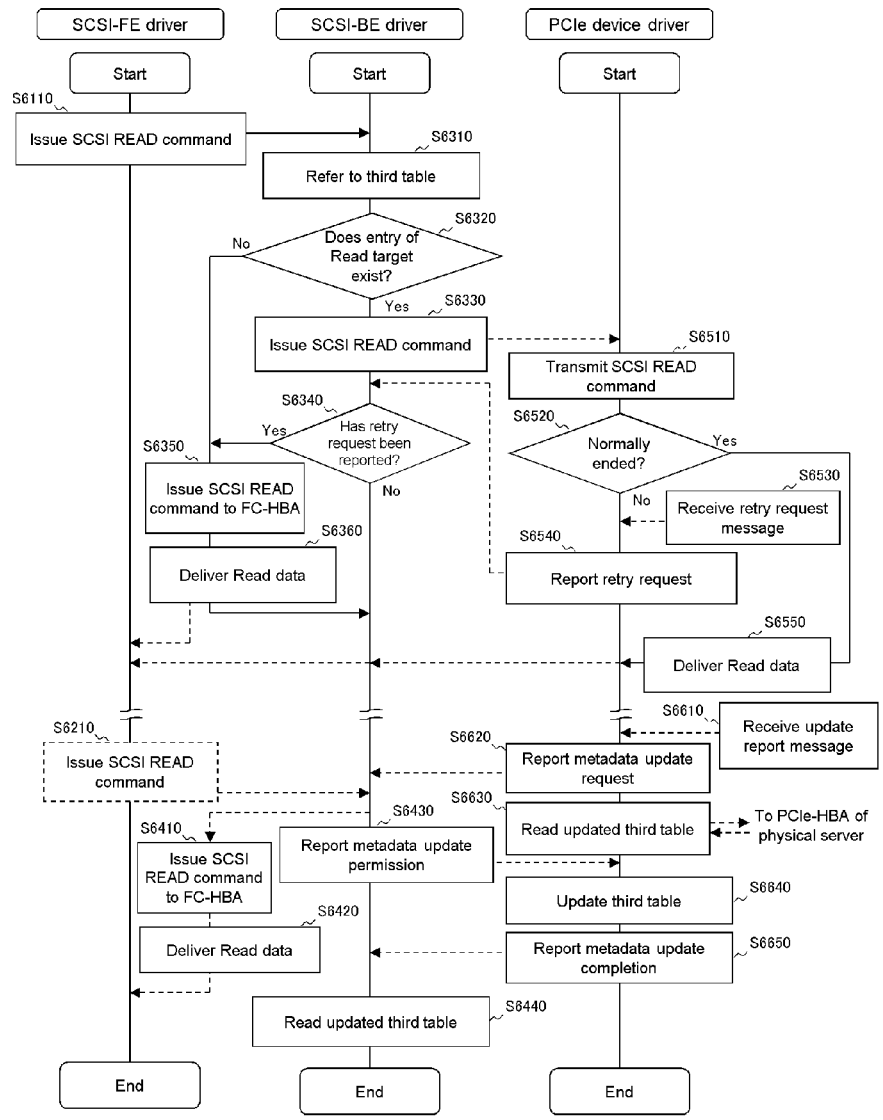
FIG. 30 illustrates a metadata update process in a physical server.

FIG. 30 illustrates the metadata update process in the physical server. This flow shows operations of the SCSI-FE driver 2230, the SCSI-BE driver 2120, and the PCIe device driver 1920, for the update of the third table. In this flow, S6110 to S6420 are similar to the I/O request process at the time of a Read request. The SCSI-FE driver 2230 issues a SCSI READ command of READ (16), READ (10), or the like (S6110).

The SCSI-BE driver 2120 refers to the third table in response to the command received in S6110 (S6310), and determines whether or not an entry of the Read target exists (S6320). If the entry of the Read target does not exist (S6320: No), the SCSI-BE driver 2120 moves the process to S6350. If the entry of the Read target exists (S6320: Yes), the SCSI-BE driver 2120 issues the received command to the PCIe device driver 1920 (S6330). In this step, the SCSI-BE driver 2120 may convert a virtual address of the received command into LBA of the external cache area.

The PCIe device driver 1920 issues the received command to the PCIe-CTL 530 in response to the command received in S6330 (S6510), and determines whether or not the command has been normally ended (S6520). If the command has been normally ended (S6520: Yes), the PCIe device driver 1920 receives Read data to send the Read data to the SCSI-BE driver 2120 (S6550). Consequently, the SCSI-BE driver 2120 delivers the Read data to the SCSI-FE driver 2230. If the command has not been normally ended (S6520: No), in the case where the PCIe device driver 1920 receives the retry request message from the PCIe-CTL 530 in S5540 (S6530), the PCIe device driver 1920 reports the retry request to the SCSI-BE driver 2120 (S6540). In the case where an abnormal end other than the reception of the retry request message occurs in S6520, the PCIe device driver 1920 performs an error process.

After S6330, the SCSI-BE driver 2120 determines whether or not the retry request has been reported from the PCIe device driver 1920 (S6340). If the retry request has not been reported (S6340: No), the SCSI-BE driver 2120 delivers the Read data received from the PCIe device driver 1920 to the SCSI-FE driver 2230. If the retry request has been reported (S6340: Yes), the SCSI-BE driver 2120 issues the received command to the FC device driver 1910 (S6350), and receives Read data from the FC device driver 1910 to send the Read data to the SCSI-FE driver 2230 (S6360).

In the case where the SCSI-FE driver 2230 issues the SCSI READ command during the update of the third table (S6210), the SCSI-BE driver 2120 receives the command to send the command to the FC device driver 1910 (S6410), and receives Read data from the FC device driver 1910 to send the Read data to the SCSI-FE driver 2230 (S6420). Upon the reception of the Read data, the SCSI-FE driver 2230 ends this flow. Note that the SCSI-BE driver 2120 may hold the SCSI READ command received during the update of the third table, until the SCSI-BE driver 2120 receives the update report message. In this case, if the SCSI-BE driver 2120 does not receive the update report message even after a lapse a predetermined period of time, the SCSI-BE driver 2120 sends out the held request to the FC device driver 1910.

Meanwhile, if the PCIe device driver 1920 receives the update report message from the PCIe-CTL 530 (S6610), the PCIe device driver 1920 converts the format of the update report message, and sends the resultant update report message to the SCSI-BE driver 2120 (S6620). Then, the PCIe device driver 1920 reads the third table after its update through the PCIe, and writes the read data into a local cache in the memory 2430 of the PCIe-HBA 1360 (S6630). Upon the reception of the update report message, the SCSI-BE driver 2120 reports metadata update permission to the PCIe device driver 1920 (S6430). Upon the reception of the metadata update permission, the PCIe device driver 1920 updates the third table in the memory 1310 with the data stored in the local cache in the memory 2430 (S6640), reports metadata update completion to the SCSI-BE driver 2120 (S6650), and ends this flow. Upon the reception of the metadata update completion, the SCSI-BE driver 2120 reads the third table after its update (S6440), and ends this flow.

According to the metadata update process in the storage apparatus and the metadata update process in the physical server described above, mismatching in the third table can be prevented between the storage apparatus 210 and the plurality of physical server 220 (and the plurality of host computers 730).

In order to avoid a decrease in performance due to the retry request when the SAS-CTL 520 receives the WRITE_SAME (UNMAP=ON) command for disabling the third table, for example, the following countermeasures are effective.

According to the first countermeasure, the DKC 310 does not disable the third table and update data in order to minimize a time lag during which mismatching occurs in data in the external cache area and to avoid the occurrence of a slight time lag caused by a search time of the third table and setting of a disablement flag to this entry. According to this countermeasure, the DKC 310 writes update data into the original data, and, at the same time, also writes the update data into a corresponding position in the external cache area, to thereby prevent the occurrence of mismatching. After that, the DKC 310 deletes, for this area, an entry from the third table using the XCOPY command. According to this countermeasure, the number of times of writing into the H-SSD 510 is increased by 1 for the purpose of mismatching prevention although the increase in the number of times of writing is slight.

According to the second countermeasure, the SCSI-BE driver 2120 checks the third table also at the time of issuing of a Write command. In the case where an area to be updated by the Write command is included in an area stored in the external cache area, the SCSI-BE driver 2120 delivers the Write command to the FC device driver 1910, and, at the same time, multicasts an entry disablement request message by means of the PCIe device driver 1920, to thereby report an entry number to be disabled by this update to the physical servers 220 and the PCIe-CTLs 530 in the same group. Upon the reception of this message, each device sets a disablement flag to this entry in its own third table. A slight decrease in performance at the time of Write is a disadvantage of this countermeasure, but does not become a problem in many cases due to an excessive operation of Read access.

These two countermeasures have an effect of suppressing data mismatching (minimizing a time lag) at high speed, similarly to disablement of an entry in the third table.

For example, because data is not written for update into moving image contents that are being delivered by the computer system 100, the original data of the update target is data used for another purpose, and may happen to satisfy the policy to be thereby replicated to the external cache area. Unlike moving image data and the like used for the original purpose, such data (file) may be hardly accessed through the PCIe. In view of this, according to the third countermeasure, the DKC 310 checks the number of PCIe accesses 3650 (a value acquired in the last time) of an area of the update target, which is always referred to for the data update. In the case where the value thereof is less than a threshold value (in the case where the update target is determined as a file without access concentration), the DKC 310 deletes this entry from the third table using the XCOPY command in place of the WRITE_SAME (UNMAP=ON) command. In actual practice, the introduction of this countermeasure will substantially eliminate the need to issue an urgent command for disabling the third table.

According to the present embodiment, in the case where the operation clients 120 and the physical servers 220 share the back-end bandwidth of the storage apparatus 210, the amount of consumption of the back-end bandwidth can be reduced.

Caching of rich data by the physical server 220 can be conceived as a comparative example for reducing the amount of consumption of the back-end bandwidth. However, it is unfavorable to further consume memory resources of the physical server 220 because the memory resources thereof are shared by the plurality of VMs. According to the present embodiment, the use of the external cache area can lead to a reduction in the amount of consumption of the back-end bandwidth without an increase in consumption of the memory resources of the physical server 220.

Using a cache apparatus including a flash memory such as an SSD can be conceived as a comparative example for reducing the amount of consumption of the back-end bandwidth. In the case where the cache apparatus is provided in each of the plurality of physical servers and where the plurality of physical servers perform the same processing, the plurality of physical servers each store therein the same data. Hence, the use efficiency of the cache apparatus is lower. Further, in the case where the cache apparatus is provided between the plurality of physical servers and the storage apparatus, every I/O is exchanged therethrough. Hence, an expensive I/O controller is necessary, and the lifetime of the flash memory is shortened. According to the present embodiment, data replicated to the external cache area has a low update frequency and a high Read frequency. Hence, the use efficiency of the external cache area can be enhanced, costs of the PCIe-CTL 530 can be suppressed, and the shortening of the lifetime of the flash memory can be prevented.

Embodiment 2

A computer system according to Embodiment 2 is a distributed network attached storage (NAS) system, and can write data from a physical server into a storage apparatus through PCIe.

Figure 31:
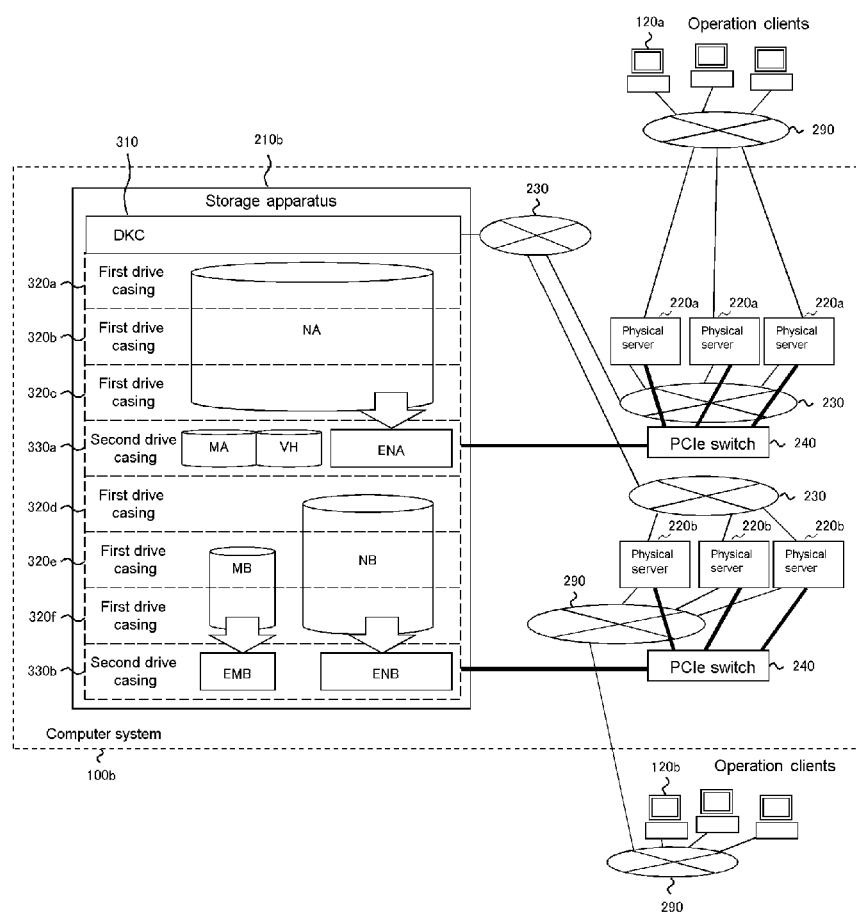
FIG. 31 illustrates a configuration of a computer system according to Embodiment 2.

FIG. 31 illustrates a configuration of the computer system according to Embodiment 2. In this computer system 100b, elements that are the same as or equivalent to those in the computer system 100 are denoted by the same reference signs. The computer system 100b includes a storage apparatus 210b, a plurality of physical servers 220a and 220b, the SAN 230 using the FC, and the PCIe switch 240. The plurality of physical servers 220a are file servers, form a server group, and are coupled to a plurality of operation clients 120a through a communication network 290 such as a local area network (LAN). Similarly, the plurality of physical servers 220b are file servers, form a server group, and are coupled to a plurality of operation clients 120b through the communication network 290 such as a LAN. The storage apparatus 210b includes: the DKC 310; first drive casings 320a, 320b, 320c, 320d, 320e, and 320f each including the SAS-HDDs 611 and the SATA-HDDs 612 similarly to the first drive casing 320; and second drive casings 330a and 330b each including the H-SSDs 510 similarly to the second drive casing 330.

The DKC 310 creates NA that is a NAS using a storage pool in each of the first drive casings 320a, 320b, and 320c, and the DKC 310 also creates: an external cache area ENA that stores therein a replica of data in the NA; and metadata MA for NAS of the NA, in the second drive casing 330a. The third table shows an association for the ENA and the MA between a storage position in the second drive casing 330a and a virtual address. Similarly to Embodiment 1, the physical server 220a refers to the third table in response to a request from the operation client 120a, to thereby access the NA through the FC and access the ENA and the MA through the PCIe. The computer system 100b stores the metadata MA for NAS that is frequently accessed, in the second drive casing 330a faster than the first drive casings 320a, 320b, and 320c, to thereby enhance performance of the distributed NAS system.

The DKC 310 may also create VH that is a normal VOL, in the second drive casing 330a. In the case where the PCIe-CTL 530 receives a Write request into the VH through the PCIe, the PCIe-CTL 530 writes data into the VH in response to the request. In the case where this Write is normally ended, the PCIe-CTL 530 returns a normal end status to a given physical server 220a that has made the Write request, and multicasts a message to the effect that the data has been written into the VH, to the physical servers 220a in the server group to which the given physical server 220a belongs. This enables the plurality of physical servers 220a to share the third table in the latest state and prevent mismatching in the third table. As a result, the responsiveness can be enhanced without consumption of the back-end bandwidth. In order to reduce hardware resources of the PCIe-CTL 530, a virtualization process is not implemented, the VH is configured as a normal VOL, and an address in the VH is easily matched for access through the PCIe.

In the case where data is written by the SAS into the VH, the SAS-CTL 520 reports the writing to the PCIe-CTL 530 using a hot line signal, and the PCIe-CTL 530 that has received the report multicasts an update report message to the server group. The physical server 220a that will update the VH may multicast in advance a pre-notice message reporting the update, to the server group, may exclusively perform the writing, and may multicast an end message at the end of the update. In this case, the storage apparatus 210 may permit Write into the VH only in the case where the pre-notice message is received, and may reject a Write request in other cases. A particular area corresponds to, for example, any of the MA and the VH. The VH is created in the second drive casing 330a faster than the first drive casings 320a, 320b, and 320c, whereby performance of the distributed NAS system is enhanced.

The first drive casings 320a, 320b, and 320c and the second drive casing 330a are effective for a system with frequent file writing, such as the update of the metadata for NAS. In contrast, the configuration of the first drive casings 320d, 320e, and 320f and the second drive casing 330b may be used for a system with less frequent file writing and frequent reading, similarly to Embodiment 1. Note that the DKC 310 creates: NB that is a NAS using a storage pool in each of the first drive casings 320d, 320e, and 320f; and metadata MB for NAS of the NB, and the DKC 310 also creates: an external cache area ENB that stores therein a replica of data in the NB; and an external cache area EMB that stores therein a replica of data in the MB, in the second drive casing 330*b*. The physical server 220*b* accesses the NB through the FC in response to a request from the operation client 120*b*, and accesses the ENB and the EMB through the PCIe. The computer system 100*b* stores replicas of the NB and the MB respectively in the ENB and the EMB faster than their replication sources, and reads the replicas through the PCIe, to thereby enhance performance of the distributed NAS system.

Embodiment 3

A computer system according to Embodiment 3 transfers, for asynchronous remote copy, difference data from a copy source storage apparatus to another storage apparatus through optical PCIe.

Figure 32:
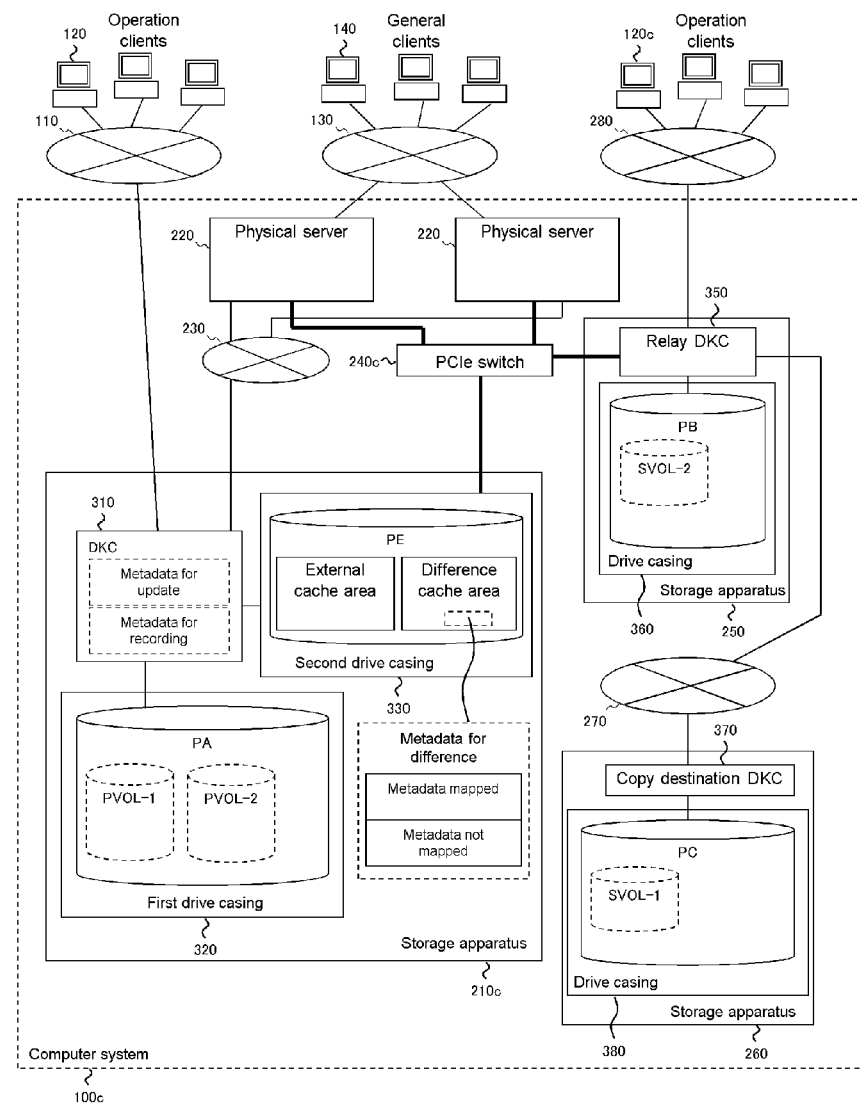
FIG. 32 illustrates a configuration of a computer system according to Embodiment 3.

FIG. 32 illustrates a configuration of a computer system according to Embodiment 3. In this computer system 100*c*, elements that are the same as or equivalent to those in the computer system 100 are denoted by the same reference signs. The computer system 100*c* includes: a copy source storage apparatus 210*c* having a configuration similar to that of the storage apparatus 210; a storage apparatus 250 for relay; a copy destination storage apparatus 260 cascade-coupled to the storage apparatus 250; the plurality of physical servers 220; the SAN 230 using the FC; and a PCIe switch 240*c*. The storage apparatus 250 includes a relay DKC 350 and a drive casing 360. The storage apparatus 260 includes a copy destination DKC 370 and a drive casing 380. The second drive casing 330 is coupled to the relay DKC 350 through the PCIe switch 240*c* using optical PCIe (PCIe over Optical). The relay DKC 350 is coupled to the copy destination DKC 370 through a communication network 270 such as a SAN. The relay DKC 350 is coupled to a plurality of operation clients 120*c* through a communication network 280 such as a SAN.

The DKC 310 creates a storage pool PA in the first drive casing 320, and creates a first primary VOL (PVOL-1) that is a virtual VOL for a remote copy target and a second primary VOL (PVOL-2) that is another virtual VOL, in the PA. The relay DKC 350 creates a storage pool PB in the drive casing 360, and creates a second secondary VOL (SVOL-2) that is a paired VOL that forms a pair with the PVOL-2, in the PB. The copy destination DKC 370 creates a storage pool PC in the drive casing 380, and creates a first secondary VOL (SVOL-1) that is a paired VOL that forms a pair with the PVOL-1, in the PC. The DKC 310 creates a storage pool PE in the second drive casing 330, and creates a difference cache area in the PE in addition to an external cache area similar to that in Embodiment 1. Difference data indicating the update of data in the virtual VOL during a particular period is written into the difference cache area. Note that snapshot data may be stored in the difference cache area. The DKC 310 creates metadata MDA and metadata MDB in the shared memory 460, selects any one thereof as metadata for recording (metadata for the next transfer), selects the other thereof as metadata for update (metadata for the present transfer), and records a third table indicating the difference data into the metadata for recording. Metadata for the external cache that is a third table for the external cache area and metadata for difference that is a third table for the difference cache area are stored in a metadata area of the second drive casing 330. The metadata for difference includes metadata that has been mapped onto a virtual address (metadata for the present transfer), and metadata that has not been mapped onto a virtual address (metadata for accumulation and the next transfer). An operation using the external cache area and the metadata for the external cache is similar to that in Embodiment 1. The relay DKC 350 includes a memory, a CPU, a PCIe-HBA, and the like similarly to the physical servers 220. The relay DKC 350 receives the metadata for difference from the PCIe-CTL 530 through the optical PCIe, and saves the received metadata for difference. The relay DKC 350 reads the difference data out of the difference cache area on the basis of the metadata for difference. According to P6 in the present embodiment, a group of the physical servers 220 is designated as a destination to which an update report message of the metadata for the external cache is multicast, and the storage apparatus 250 is designated as a destination to which an update report message of the metadata for difference is multicast.

Difference data and snapshot data in asynchronous remote copy do not need to be rewritten, and thus are suitable to be read through the PCIe. The asynchronous remote copy according to the present embodiment is not of a push type but of a pull type. In the push type, the copy source storage apparatus transmits the difference data to the storage apparatus for relay. In the pull type, the storage apparatus 250 for relay reads the difference data out of the copy source storage apparatus 210*c*.

Figure 33:
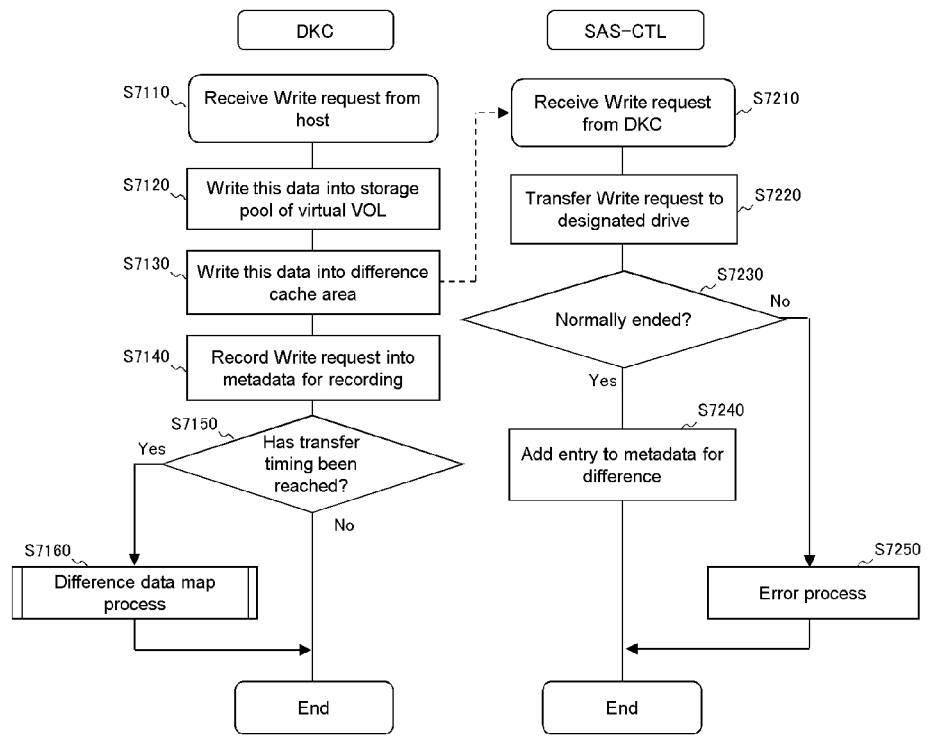
FIG. 33 illustrates a normal Write process.

FIG. 33 illustrates a normal Write process. This flow shows operations of the DKC 310 and the SAS-CTL 520. Upon the reception of a Write request from the operation client 120 (an example of the host computers 730) (S7110), the DKC 310 writes the data into the storage pool providing the virtual VOL of a write target of the Write request (S7120), and sends a Write request for writing the data into the difference cache area, to the SAS-CTL 520 (S7130). After that, the DKC 310 records the Write request into the metadata for recording (S7140), and determines whether or not transfer timing of asynchronous remote copy has been reached (S7150). If the transfer timing thereof has not been reached (S7150: No), the DKC 310 ends this flow. If the transfer timing thereof has been reached (S7150: Yes), the DKC 310 performs a difference data map process of associating a virtual address of difference data with an address in the difference cache area (S7160), and ends this flow.

Upon the reception of the Write request from the DKC 310 (S7210), the SAS-CTL 520 transfers the Write request to a drive designated in the Write request (S7220), and determines whether or not the Write request has been normally ended (S7230). If the Write request has not been normally ended (S7230: No), the SAS-CTL 520 performs an error process (S7250), and ends this flow. If the Write request has been normally ended (S7230: Yes), the SAS-CTL 520 adds an entry corresponding to the target data of the Write request, to the metadata for difference (S7240), and ends this flow. Here, an update report message is not issued. A particular period corresponds to, for example, a period from a given transfer timing to the next transfer timing.

Figure 34:
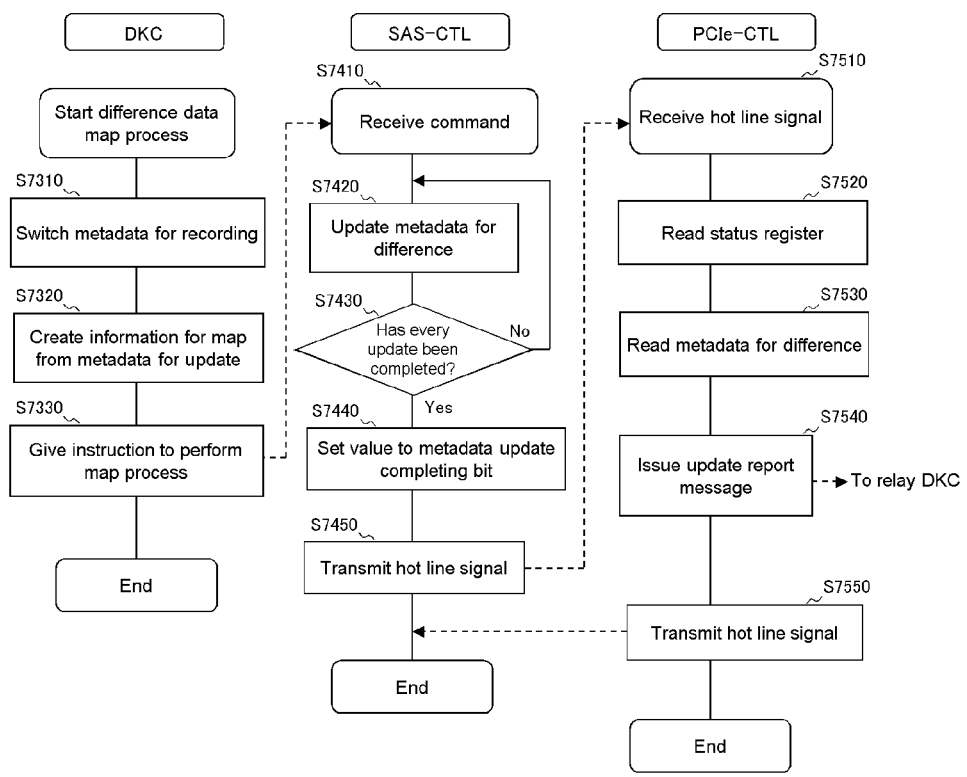
FIG. 34 illustrates a difference data map process.

FIG. 34 illustrates the difference data map process. This flow shows operations of the DKC 310, the SAS-CTL 520, and the PCIe-CTL 530. The DKC 310 switches the metadata for recording and the metadata for update between the MDA and the MDB (S7310). The DKC 310 creates information for map (descriptor) indicating an association between a virtual address indicated in the metadata for update and an address in the difference cache area (S7320). The DKC 310 transmits an XCOPY command including the information for map to the SAS-CTL 520, to thereby give an instruction to perform the map process on the metadata for difference (S7330), and ends this flow.

Upon the reception of the XCOPY command from the DKC 310 (S7410), the SAS-CTL 520 updates the metadata for difference on the basis of the descriptor (S7420), and determines whether or not every update has been completed for the descriptor (S7430). If every update has not been completed (S7430: No), the SAS-CTL 520 moves the process to S7420. If every update has been completed (S7430: Yes), the SAS-CTL 520 sets the metadata update completing bit 4120 to ON (S7440), transmits a hot line signal (S7450), and ends this flow.

Upon the reception of the hot line signal from the SAS-CTL 520 (S7510), the PCIe-CTL 530 reads the status register (S7520), reads the metadata for difference after its update, out of the metadata area (S7530), issues an update report message to the relay DKC 350 (S7540), transmits a hot line signal to the SAS-CTL 520 (S7550), and ends this flow.

Figure 35:
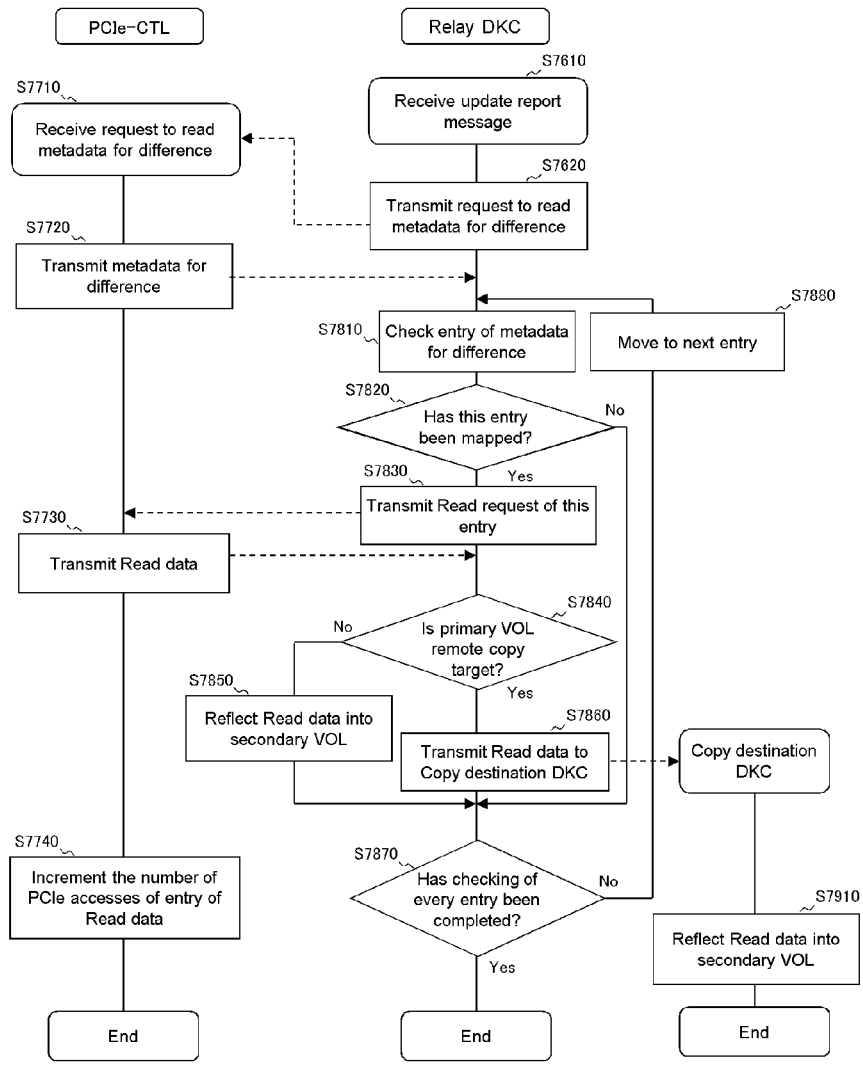
FIG. 35 illustrates a remote copy process.

FIG. 35 illustrates a remote copy process. This flow is a process of copying the difference data in the virtual VOL to the storage apparatus 260 through the storage apparatus 250, and shows operations of the PCIe-CTL 530, the relay DKC 350, and the copy destination DKC 370. Upon the reception of an update report message from the PCIe-CTL 530 (S7610), the relay DKC 350 transmits a request to read the third table to the PCIe-CTL 530 (S7620). Upon the reception of the request to read the third table (S7710), the PCIe-CTL 530 reads the metadata for difference out of the metadata area, and transmits the read metadata for difference to the relay DKC 350 (S7720).

The relay DKC 350 checks an entry in the received metadata for difference (S7810), and determines whether or not this entry has been mapped onto a virtual address (S7820). If this entry has not been mapped (S7820: No), the relay DKC 350 moves the process to S7870. If this entry has been mapped (S7820: Yes), the relay DKC 350 transmits a Read request of data of this entry to the PCIe-CTL 530 (S7830). The PCIe-CTL 530 reads Read data in response to the Read request, and transmits the Read data to the relay DKC 350 (S7730). The PCIe-CTL 530 adds 1 to the number of PCIe accesses of the entry of the Read data in the metadata for difference (S7740), and ends this flow. Upon the reception of the Read data, the relay DKC 350 determines whether or not a virtual VOL (a primary VOL) of this entry is a remote copy target (S7840). If the virtual VOL thereof is not a remote copy target (S7840: No), the relay DKC 350 reflects the Read data into the secondary VOL (SVOL-2) (S7850). If the virtual VOL thereof is a remote copy target (S7840: Yes), the relay DKC 350 transmits the Read data to the copy destination DKC 370 (S7860). After that, the relay DKC 350 determines whether or not the checking of every entry in the metadata for difference has been completed (S7870). If the checking thereof has been completed (S7870: Yes), the relay DKC 350 ends this flow. If the checking thereof has not been completed (S7870: No), the relay DKC 350 moves to the next entry in the metadata for difference (S7880), and moves the process to S7810. Upon the reception of the Read data from the relay DKC 350 in S7860, the copy destination DKC 370 reflects the Read data into the secondary VOL (SVOL-1) (S7910), and ends this flow.

The data of the remote copy target transmitted in S7860 is not stored into the storage apparatus 250. It is sufficient for the storage apparatus 250 to transfer difference data to the storage apparatus 260 each time the storage apparatus 250 reads the difference data out of the storage apparatus 210c, and hence the cache memory on the DKC 350 is hardly consumed. Further, reading the difference data does not consume the back-end bandwidth of the storage apparatus 210c. The combination with Embodiment 2 can prevent sharing of the PCIe-side bandwidth of the storage apparatus 210c.

Figure 36:
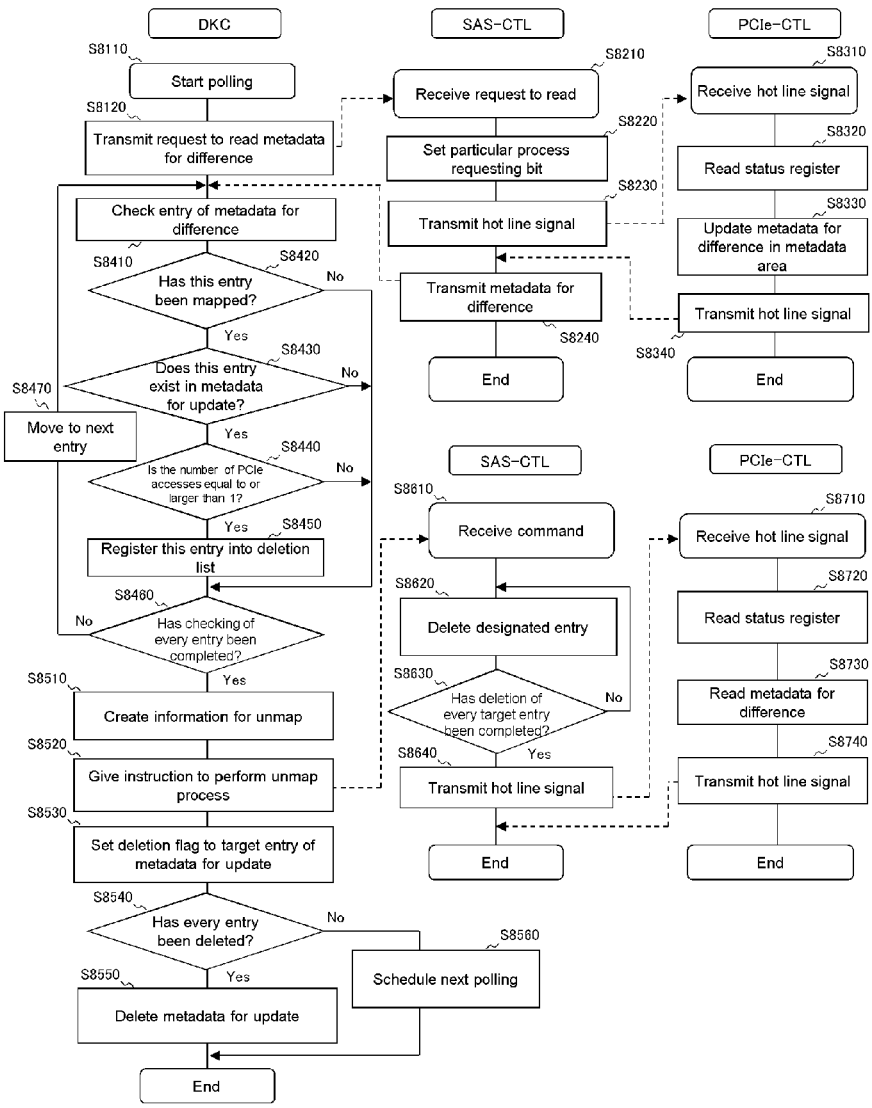
FIG. 36 illustrates a remote copy completed difference cache area release process.

FIG. 36 illustrates a remote copy completed difference cache area release process. This flow is a process of releasing an area of data that has been read by the relay DKC 350 in the difference cache area, and shows operations of the DKC 310, the SAS-CTL 520, and the PCIe-CTL 530. The DKC 310 starts polling according to schedule (S8110), and transmits a request to read the metadata for difference using the MODE_SENSE command to the SAS-CTL 520 (S8120). Upon the reception of the request to read (S8210), the SAS-CTL 520 sets, to ON, a bit of the request to read the metadata for difference in the particular process requesting bit 4170 of the status register (S8220), and transmits a hot line signal (S8230). Upon the reception of the hot line signal (S8310), the PCIe-CTL 530 reads the status register (S8320), updates the number of PCIe accesses 3650 and the like of the metadata for difference in the metadata area (S8330), transmits a hot line signal (S8340), and ends this flow. Upon the reception of the hot line signal, the SAS-CTL 520 reads the metadata for difference out of the metadata area, transmits the read metadata for difference to the DKC 310 (S8240), and ends this flow.

Upon the reception of the metadata for difference, the DKC 310 checks an entry in the metadata for difference (S8410), and determines whether or not this entry has been mapped onto a virtual address (S8420). If this entry has not been mapped (S8420: No), the DKC 310 moves the process to S8460. If this entry has been mapped (S8420: Yes), the DKC 310 determines whether or not this entry is registered in the metadata for update (S8430). If this entry is not registered (S8430: No), the DKC 310 moves the process to S8460. If this entry is registered (S8430: Yes), the DKC 310 determines whether or not the number of PCIe accesses 3650 of this entry is equal to or larger than 1 (this entry has been read by the relay DKC 350) (S8440). If the number of PCIe accesses 3650 thereof is not equal to or larger than 1 (S8440: No), the DKC 310 moves the process to S8460. If the number of PCIe accesses 3650 thereof is equal to or larger than 1 (S8440: Yes), the DKC 310 registers this entry into the list for unmap (the deletion list) in the shared memory 460 (S8450), and determines whether or not the checking of every entry in the metadata for difference has been completed (S8460). If the checking thereof has not been completed (S8460: No), the DKC 310 moves to the next entry in the metadata for difference (S8470), and moves the process to S8410.

If the checking thereof has been completed (S8460: Yes), the DKC 310 creates information for unmap (descriptor) on the basis of the list for unmap (S8510). The DKC 310 issues an XCOPY command including the information for unmap to the SAS-CTL 520, to thereby give an instruction to perform the unmap process on the metadata for difference, and sets the metadata update report inhibiting bit 4150 to ON (S8520). In this step, the DKC 310 may issue an XCOPY command using the information for map, or may issue an XCOPY command for each deletion target entry. Upon the reception of the XCOPY command (S8610), the SAS-CTL 520 deletes the entry designated in the descriptor (S8620), and determines whether or not the deletion of every target entry according to the XCOPY command has been completed (S8630). If the deletion thereof has not been completed (S8630: No), the SAS-CTL 520 moves the process to S8620, and processes the next target entry. If the deletion thereof has been completed (S8630: Yes), the SAS-CTL 520 transmits a hot line signal (S8640). Upon the reception of the hot line signal (S8710), the PCIe-CTL 530 reads the status register (S8720), reads the metadata for difference after its update out of the metadata area (S8730), transmits a hot line signal (S8740), and ends this flow. Upon the reception of the hot line signal, the SAS-CTL 520 ends this flow.

After S8520, the DKC 310 sets a deletion flag to the target entry in the metadata for update (S8530), and determines whether or not every entry in the metadata for update has been deleted (S8540). If every entry has been deleted (S8540: Yes), the DKC 310 deletes the metadata for update (S8550). If every entry has not been deleted (S8540: No), the DKC 310 schedules the next polling (S8560). Then, the DKC 310 ends this flow.

Data that is backed up in conventional asynchronous remote copy is read into a cache memory, but cache effects are not provided, and the volume of the cache memory becomes lacking, resulting in a decrease in effects of other caches and consumption of a back-end bandwidth. According to the present embodiment, difference data is read out of the difference cache area at the timing of transfer to the storage apparatus 250, and hence the back-end bandwidth of the storage apparatus 210c is not consumed. The PCIe-CTL 530 transmits an update report message to the relay DKC 350, whereby the relay DKC 350 can read the difference data according to the difference data map process. Further, because the relay DKC 350 reads only the difference data that is associated with a virtual address by the map process, from the metadata for difference, even if the DKC 310 receives a Write request from a higher-level apparatus during the reading, the corresponding Write data can be replicated to the difference data area. Even if the relay DKC 350 reads the metadata for difference after an entry in the metadata for difference is created by the Write data, because this entry is not associated with a virtual address, difference data of this entry is not read out of the relay DKC 350. Further, the DKC 310 switchingly uses the metadata for recording and the metadata for update at each transfer timing, whereby the DKC 310 stores information on a Write request received after the previous map process is determined, separately for giving an instruction to perform the next map process. This eliminates the need to switch the difference cache area, and hence the size of the area for storing the difference data according to the present embodiment can be only one-third to one-fourth of the size according to a method of switching between the area for writing the difference data and the area for reading the difference data in the conventional asynchronous remote copy. Moreover, if the cycle of the transfer timing is configured to be shorter than usual, the size of the update data area can be further reduced.

REFERENCE SIGNS LIST 100, 100b, 100c: computer system, 200, 210, 210b, 210c, 250, 260: storage apparatus, 220, 220a, 220b: physical server, 240, 240c: PCIe switch, 300, 310: DKC, 320, 320a-320f: first drive casing, 330, 330a, 330b: second drive casing, 350: relay DKC, 370: copy destination DKC, 510: H-SSD, 520: SAS-CTL, 530: PCIe-CTL, 611: SAS-HDD, 612: SATA-HDD, 710: first I/O controller, 720: second I/O controller, 730: host computer, 740: first storage device, 750: second storage device, 780: first communication channel, 790: second communication channel

The invention claimed is:

1. A computer system comprising:
a host computer;
a first controller coupled to the host computer through a first communication channel;
a second controller coupled to the host computer through a second communication channel;
a first storage device coupled to the first controller; and
a second storage device that is coupled to the first controller through a first interface and is coupled to the second controller through a second interface,
wherein the first controller is configured to:
  receive data from the host computer through the first communication channel;
  write the received data into the first storage device;
  identify part of the received data as first data, the part of the received data satisfying condition; and
  write a replica of the first data as second data into the second storage device,
wherein the second controller is configured to:
  read the second data from the second storage device in response to a read request received from the host computer through the second communication channel; and
  transmit the second data to the host computer through the second communication channel,
wherein the first controller is further configured to create metadata indicating an association between a storage position of the second data in the second storage device and a virtual address of the second data,
wherein the second controller is further configured to transmit the metadata to the host computer through the second communication channel, and
wherein the host computer is configured to:
  receive the metadata;
  determine, when the read request occurs, whether or not a virtual address designated in the read request is included in the metadata; and
  transmit, when determining that the designated virtual address is included in the metadata, the read request to the second controller through the second communication channel.

2. The computer system according to claim 1,
wherein the first controller is configured to write the first data into the first storage device according to a RAID scheme with redundancy; and write the second data into the second storage device according to a scheme with redundancy lower than that of the RAID scheme.

3. The computer system according to claim 1,
wherein the second controller is configured to transmit, in accordance with a change in a state of the second data stored in the second storage device, a state change report indicating the change, to the host computer through the second communication channel without depending on an instruction from the host computer.

4. The computer system according to claim 1,
wherein the first controller is configured to migrate the first data to a third storage device whose costs per unit storage capacity are lower than those of the first storage device, after writing the second data into the second storage device.

5. The computer system according to claim 1,
wherein the host computer is configured to transmit, when determining that the designated virtual address is not included in the metadata, the read request to the first controller through the first communication channel.

6. The computer system according to claim 5,
wherein the first controller is configured to update the metadata after writing the second data and report the update of the metadata to the second controller, and
wherein the second controller is configured to transmit the metadata to the host computer through the second communication channel.

7. The computer system according to claim 1,
wherein the particular condition requires that the first data is sequential access data.

8. The computer system according to claim 7,
wherein the particular condition requires that an access frequency of the first data satisfies a preset replication condition.

9. The computer system according to claim 8,
wherein the first controller is configured to release, when an access frequency of the second data through the second communication channel satisfies a preset release condition, a storage area of the second data.

10. The computer system according to claim 9,
wherein the first controller is configured to determine the release condition and the replication condition on a regular schedule.

11. The computer system according to claim 10,
wherein the first storage device is a hierarchical storage including a plurality of types of memory apparatuses, and
wherein the first controller is configured to migrate the first data to a layer lower than a layer in which the first data is stored, after writing the second data.

12. The computer system according to claim 1, further comprising a second host computer having a configuration of the host computer,
wherein the metadata indicates an association between a particular area in the second storage device and a virtual address of the particular area,
wherein the host computer is configured to transmit second written data to the second controller through the second communication channel, on a basis of the metadata, and
wherein the second controller is configured to:
receive the second written data;
write the second written data into the particular area;
create metadata indicating an association between a storage position of the second written data and a virtual address of the second written data; and
transmit the created metadata to the host computer and the second host computer through the second communication channel.

13. The computer system according to claim 1, further comprising a storage apparatus coupled to the second controller through the second communication channel,
wherein the first controller is configured to:
write difference data indicating update of data in the first storage device during a particular period, into the second storage device; and
create metadata for difference indicating an association between a storage position of the difference data in the second storage device and a virtual address of the difference data,
wherein the second controller is configured to transmit the metadata for difference to the storage apparatus through the second communication channel,
wherein the storage apparatus is configured to:
receive the metadata for difference; and
transmit a read request of the difference data to the second controller through the second communication channel, on a basis of the metadata for difference, and
wherein the second controller is configured to:
read, when receiving the read request of the difference data from the storage apparatus through the second communication channel, the difference data from the second storage device; and
transmit the read difference data to the storage apparatus through the second communication channel.

14. A method of controlling a computer system, comprising:
receiving, by a first controller coupled to a host computer through a first communication channel, data from the host computer through the first communication channel;
writing, by the first controller, the received data into a first storage device coupled to the first controller;
identifying, by the first controller, part of the received data as first data, the part of the received data satisfying a preset particular condition;
writing, by the first controller, second data that is a replica of the first data, into a second storage device through a first interface;
reading, by a second controller coupled to the host computer through a second communication channel, the second data from the second storage device through a second interface in response to a read request received from the host computer through the second communication channel, and transmitting the second data to the host computer through the second communication channel;
creating, by the first controller, metadata indicating an association between a storage position of the second data in the second storage device and a virtual address of the second data;
transmitting, by the second controller, the metadata to the host computer through the second communication channel;
receiving, by the host computer, the metadata;
determining, by the host computer, when the read request occurs, whether or not a virtual address designated in the read request is included in the metadata; and
transmitting, by the host computer, when determining that the designated virtual address is included in the metadata, the read request to the second controller through the second communication channel.

* * * * *